(12) United States Patent
Kenneally

(10) Patent No.: US 10,619,907 B2
(45) Date of Patent: Apr. 14, 2020

(54) REFRIGERATED, THERMALLY INSULATED, COLLAPSIBLE COVER SYSTEM, ASSEMBLY AND METHOD OF USING TO TRANSPORT PERISHABLE PRODUCTS

(71) Applicant: Keith A. Kenneally, South San Francisco, CA (US)

(72) Inventor: Keith A. Kenneally, South San Francisco, CA (US)

(*) Notice: Subject to any disclaimer, the term of this patent is extended or adjusted under 35 U.S.C. 154(b) by 237 days.

(21) Appl. No.: 15/946,758

(22) Filed: Apr. 6, 2018

(65) Prior Publication Data
US 2018/0347887 A1 Dec. 6, 2018

Related U.S. Application Data

(60) Provisional application No. 62/513,193, filed on May 31, 2017.

(51) Int. Cl.
*F25D 17/06* (2006.01)
*F25D 3/12* (2006.01)
(Continued)

(52) U.S. Cl.
CPC ............. *F25D 17/06* (2013.01); *F25D 3/125* (2013.01); *F25D 23/063* (2013.01); *F25D 29/005* (2013.01); *F25D 2303/082* (2013.01); *F25D 2303/0844* (2013.01); *F25D 2317/0654* (2013.01); *F25D 2317/0665* (2013.01);
(Continued)

(58) Field of Classification Search
CPC .. F25D 23/063; F25D 3/125; F25D 2323/061; F25D 17/06; F25D 3/08; F25D 3/107; F25D 11/003; B65D 81/38; B65D 2519/0086; B65D 19/38
See application file for complete search history.

(56) References Cited

U.S. PATENT DOCUMENTS 2,087,966 A * 7/1937 Clark ................. B65D 81/3834
62/457.1
3,280,586 A * 10/1966 Toyomatsu ............. F25D 16/00
62/371
(Continued)

*Primary Examiner* — Cassey D Bauer
(74) *Attorney, Agent, or Firm* — Charles L. Thoeming

(57) ABSTRACT

A reusable, substantially airtight, and insulated container system, assembly and method include detachable assembled top, side, and bottom panels to enclose a plurality of pallets of chilled, perishable products for transport. The top panel includes a plurality of pouches positioned within horizontal chambers within the inside top panel surface. Hook and loop closures secure and seal the panel assemblies. Thermoplastic polyurethane nylon fabric panel inner and outer surfaces are bonded to an internal insulation layer with thermal-welded edges. The system, assembly, and method include internal temperature control elements for a real time thermostatically controlled container environment protecting chilled products housed within the cover assembly during transport. An embodiment of the cover assembly is configured to a standard LD-7 air transport container base pallet, providing a thermostatically controlled container environment of approximately 745 cubic feet. The assembled top, side, and bottom panels are collapsible for easy storage and transport when not in use.

24 Claims, 24 Drawing Sheets

(51) Int. Cl.
*F25D 23/06* (2006.01)
*F25D 29/00* (2006.01)

(52) U.S. Cl.
CPC ............ *F25D 2317/0672* (2013.01); *F25D 2317/0682* (2013.01); *F25D 2323/061* (2013.01); *F25D 2700/12* (2013.01)

(56) References Cited

U.S. PATENT DOCUMENTS

| | | | | |
|---|---|---|---|---|
| 4,868,955 A * | 9/1989 | Magnant | ............... | B65D 63/10 24/306 |
| 5,007,246 A * | 4/1991 | Kruck | ................... | F25D 11/00 200/61.7 |
| 5,009,081 A * | 4/1991 | Kruck | ................... | F25D 11/00 62/264 |
| 5,477,965 A * | 12/1995 | Herbeck | .............. | A45C 7/0095 150/154 |
| 5,709,104 A * | 1/1998 | Howcroft | ................. | F25D 3/14 62/371 |
| 6,027,249 A * | 2/2000 | Bielinski | ............ | B65D 81/3897 150/156 |
| 6,041,718 A * | 3/2000 | Brandes | ............ | B65D 19/0012 108/51.3 |
| 6,074,093 A * | 6/2000 | Anderson | ................ | B65D 5/02 383/110 |
| 6,079,560 A * | 6/2000 | Champion | .............. | A47F 3/142 206/386 |
| 7,377,692 B1 * | 5/2008 | Troncoso | ................. | A45F 3/18 383/110 |
| 8,250,835 B2 | 8/2012 | Kenneally | | |
| 8,292,119 B2 * | 10/2012 | Kenneally | ............... | F25D 3/125 220/315 |
| 2002/0088244 A1 * | 7/2002 | Jennings | ............... | A47F 3/0404 62/371 |
| 2003/0101742 A1 * | 6/2003 | Norelius | ............... | B65D 88/14 62/387 |
| 2006/0243365 A1 * | 11/2006 | Chiapuzio | .............. | A45C 11/20 150/154 |
| 2007/0256440 A1 * | 11/2007 | Trotter | .................... | F25D 11/00 62/298 |
| 2008/0163628 A1 * | 7/2008 | Lilke | ...................... | F25B 21/02 62/3.6 |
| 2009/0212047 A1 * | 8/2009 | Harman | ................. | B65D 88/14 220/1.5 |
| 2010/0218532 A1 * | 9/2010 | Beliczynski | .......... | A45C 15/00 62/259.1 |
| 2011/0226783 A1 * | 9/2011 | Sawaki | ............. | B65D 81/3855 220/592.2 |
| 2001/0258972 | 10/2011 | Kenneally | | |
| 2013/0082044 A1 * | 4/2013 | Doan | ................... | H05B 6/6426 219/387 |
| 2013/0319020 A1 * | 12/2013 | Neeld | ..................... | F25D 29/00 62/89 |
| 2014/0157794 A1 * | 6/2014 | McGann | ............. | F25B 21/04 62/3.2 |
| 2014/0318153 A1 * | 10/2014 | Ilercil | .................... | F25B 21/04 62/3.3 |
| 2015/0175327 A1 * | 6/2015 | Holderby | ............ | B65D 51/245 62/62 |
| 2016/0003505 A1 * | 1/2016 | Trotter | ................. | F25B 27/007 62/235.1 |
| 2016/0131409 A1 * | 5/2016 | Rigaud | ................ | F25B 17/08 62/4 |
| 2016/0227802 A1 * | 8/2016 | Tanaka | .................... | A23B 7/04 |

\* cited by examiner

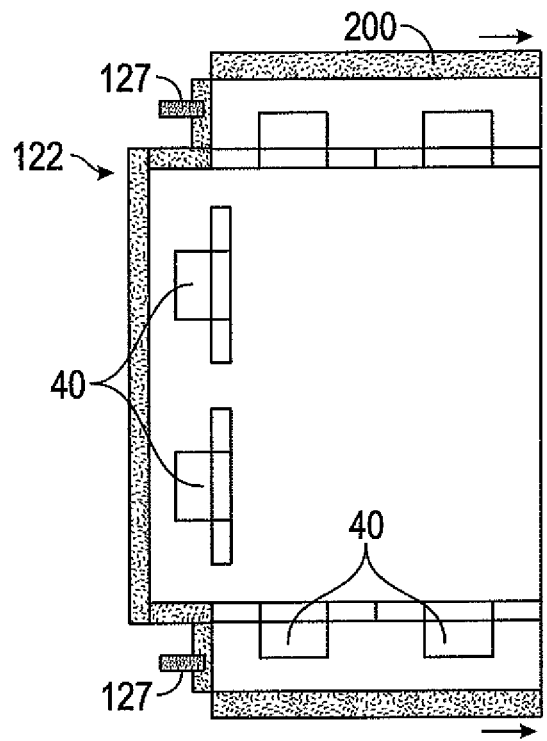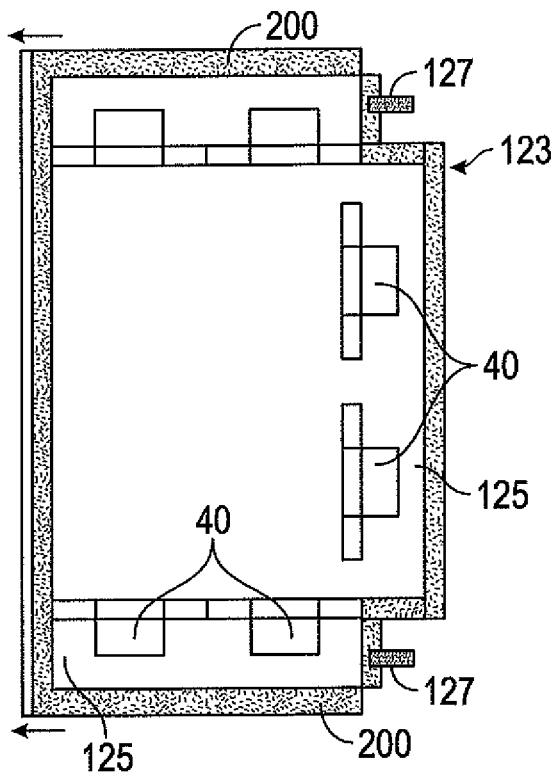
FIG. 16A   FIG. 16B
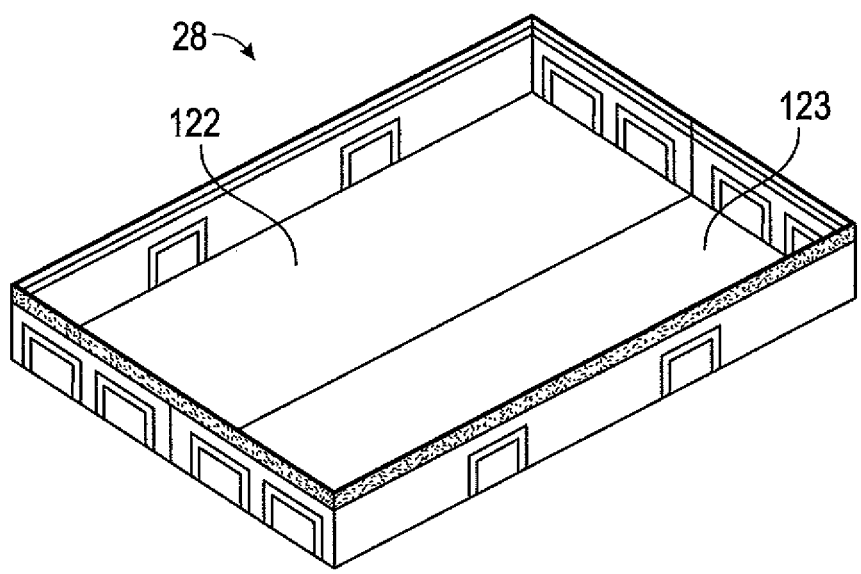
FIG. 16C

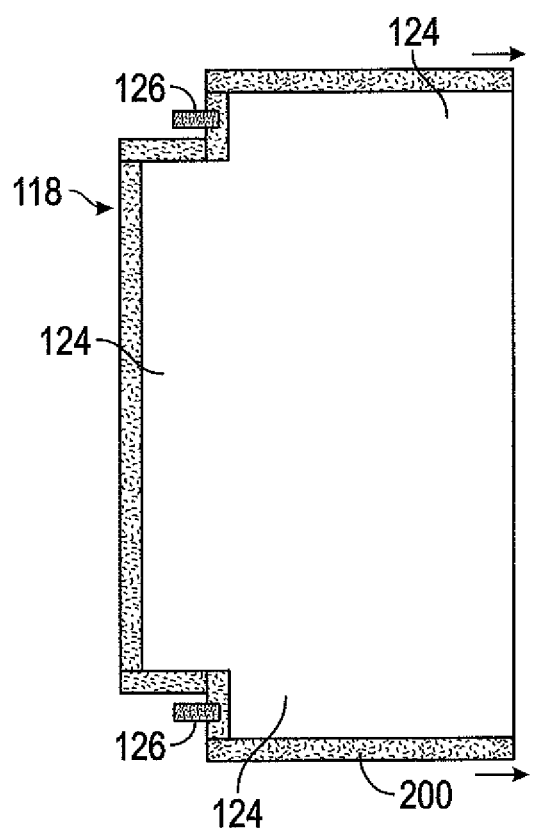
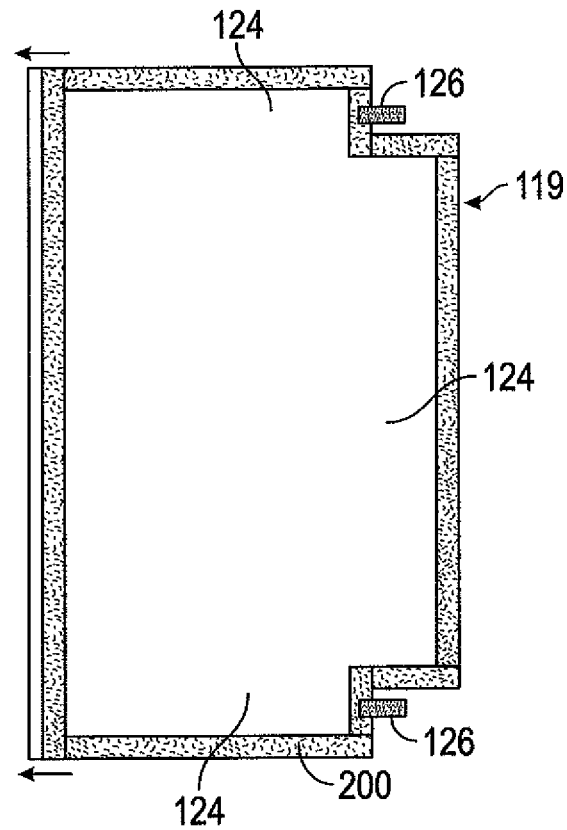
FIG. 18A  FIG. 18B
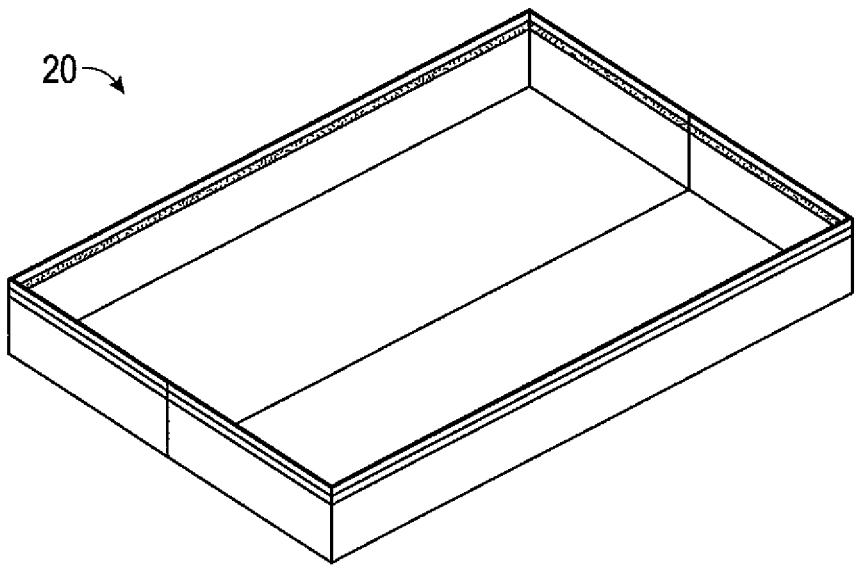
FIG. 18C

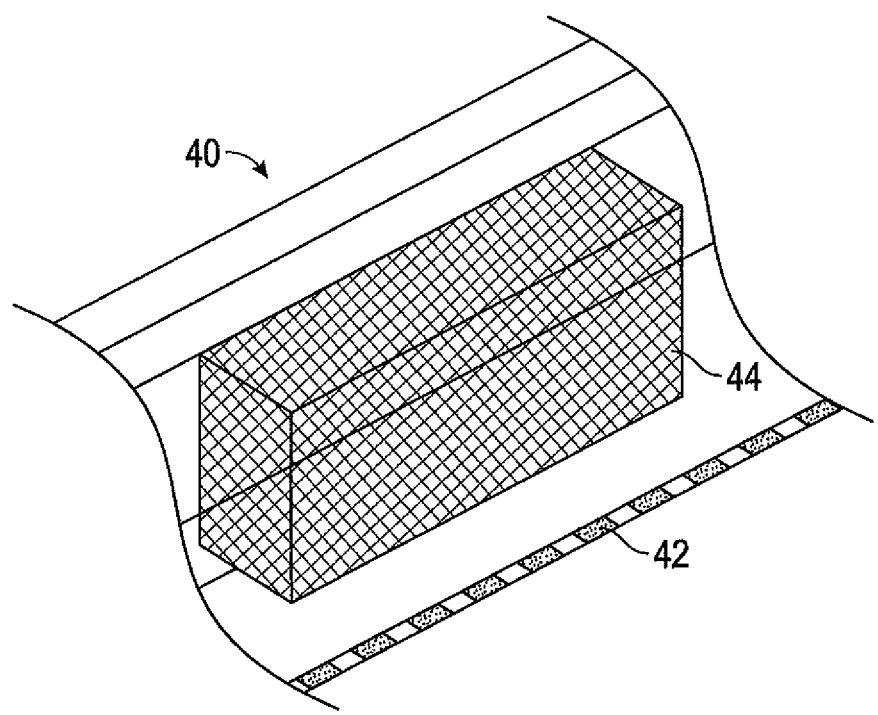
FIG. 21
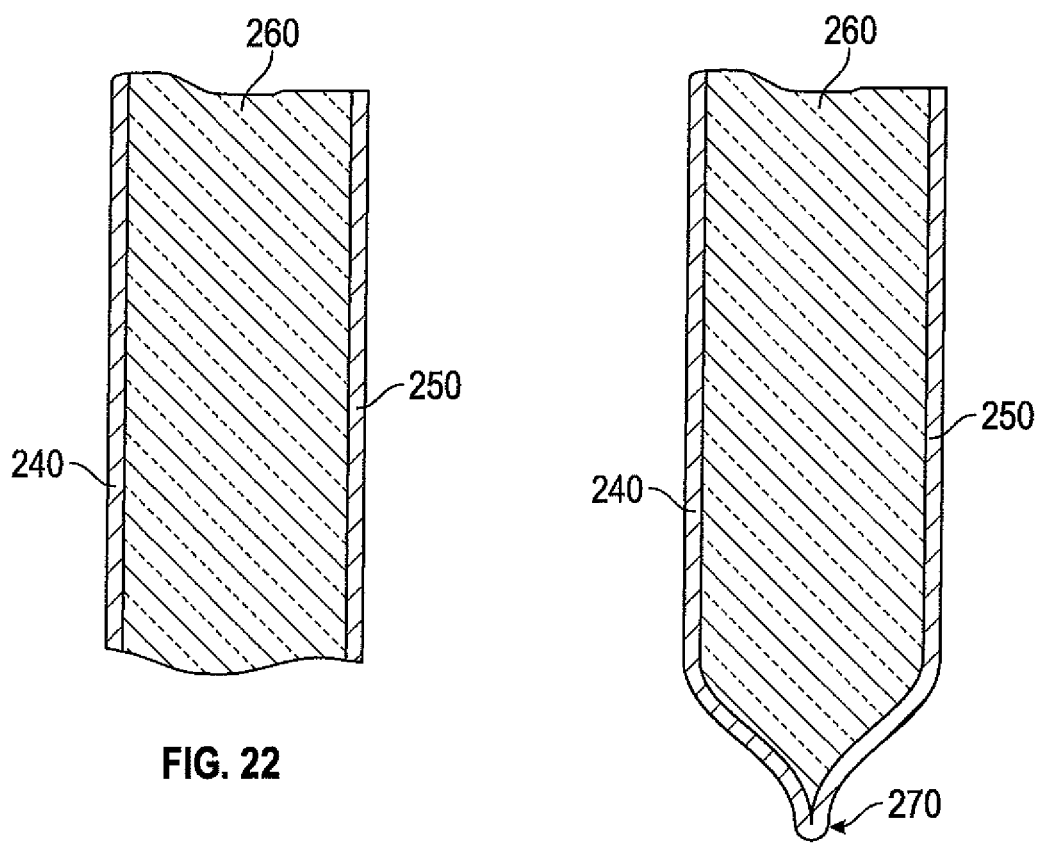
FIG. 22
FIG. 23

US 10,619,907 B2

REFRIGERATED, THERMALLY INSULATED, COLLAPSIBLE COVER SYSTEM, ASSEMBLY AND METHOD OF USING TO TRANSPORT PERISHABLE PRODUCTS

CROSS-REFERENCES TO RELATED APPLICATIONS

This United States non-provisional patent application is based upon and claims the filing date of U.S. provisional patent application Ser. No. 62/513,193, filed May 31, 2017.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to preserving perishable products. More particularly, the invention is related to a thermally insulated, collapsible cover with an internally controlled cooling assembly used to preserve the temperature of, and prevent heat damage and chill injury to, perishable products during long distance transit and to deliver the perishable products to a destination point at a desired temperature.

BACKGROUND OF THE INVENTION

Several methods and associated apparatus for protecting perishable products during transport have been used including insulated cargo quilts, refrigerated carts, plastic wrapped pallets, vacuum and the like. These methods and related apparatus either include dedicated, one-time use materials or hardware items that are bulky and difficult to return for re-use or re-shipment.

Further, these methods and associated apparatus are limited in their thermal insulation qualities and as such are unsuitable for extended transport logistics which may include off-loading to land based delivery transportation.

The thermally insulated, collapsible cover assembly and method of using to transport perishable products of U.S. Pat. No. 8,250,835 provides an insulated container which is collapsible for after use for protective storage and transport for shipping and reuse. The collapsible insulated Jet Pod® cover assembly breaks down to allow it to be stored or boxed and shipped, by having some or all the jet pod cover assembly sidewalls and sidewall edges foldable to collapse and fit together with the cover bottom and top portions into a shipping box for return after use. Rigid portions of the jet pod cover assembly likewise are capable of being contained with the jet pod cover assembly bottom and top portions within the shipping box. All components of the thermally insulated, collapsible cover assembly and method of using to transport perishable products of U.S. Pat. No. 8,250,835 are recyclable in keeping with the green initiatives being introduced in and favored by the product transport protection industry.

Likewise, the cooler box of U.S. Pat. No. 8,292,119 provides an insulated container which is collapsible for smaller storage or shipping for reuse. The collapsible insulated cooler box breaks down to allow it to be stored or boxed and shipped, by having some or all the container sidewalls and sidewall edges foldable to collapse and fit within the container bottom and top surfaces. Rigid portions of the cooler box likewise are capable of being contained within the container bottom and top surfaces and collapsed side walls. All components of the cooler box of U.S. Pat. No. 8,292,119 are recyclable in keeping with the green initiatives being introduced in and favored by the product transport protection industry.

Applicant's prior U.S. Pat. No. 8,250,835, entitled Thermally Insulated, Collapsible Cover Assembly and Method of Using to Transport Perishable Produce, and Applicant's prior U.S. Pat. No. 8,292,119, entitled Cooler Box, are hereby incorporated by reference in their entirety. These inventions, while demonstrably overcoming the limitations of the prior art and suitable for their intended utility, are not capable for keeping large shipments of perishable products within a desired temperature range over extended periods of time.

The refrigerated, thermally insulated, collapsible cover assembly and method of using to transport perishable products includes, without limitation, the following examples of products which would benefit from the disclosed embodiments in this application: diagnostic and clinical specimen, blood serums, pharmaceuticals, and non-frozen produce or food items. In many instances, multi-governmental regulations govern the transport of these products.

For instance, in the non-frozen food and produce arena, on Jan. 4, 2011, the Food Safety Modernization Act (FSMA) was signed into law. The FSMA was prompted after many reported incidents of foodborne illnesses during the first decade of this century and was largely crafted by members of the Grocery Manufacturers Association. Tainted food has cost the food industry billions of dollars in recalls, lost sales and legal expenses. The FSMA is the first major piece of federal legislation addressing food safety since 1938. It is also the first piece of legislation to address intentional adulteration and food defense. The standards and requirements for perishable food transport are significantly heightened by this legislation, requiring better systems to handle producing, processing, transporting, and preparing foods to insure a safer food supply. The FSMA Final Rule on Sanitary Transportation of Human and Animal Food went into effect on Apr. 16, 2017. For transporting perishable foods, the FMSA now demands carriers' strict adherence when planning temperature requirements for shipments. If temperatures during transport go outside of the requirements and the food is deemed adulterated, the consequences can be serious, including refusal at receiving, waste, and possible litigation. Shippers are required to communicate, in writing, their food safety requirements to carriers in equipment, operations and training. Many aspects of the FSMA reflect harmony with international efforts to handle producing, processing, transporting, and preparing foods to insure a safer food supply.

Response by produce shippers to the FMSA, and other governmental standards for medical and biologic safe transport, is to increase use of bubble wrap insulation and glycol-based gel cool packs. This approach presents non-reusable waste or toxic by-products. For example, each LD-7 container requires at least 500 square feet of bubble wrap insulation and nearly 50 pounds of glycol-based gel cool packs. For air transport of products between Hawaii and the mainland United States, the annual use of these non-reusable products would generate 2.5 million square feet of bubble wrap, and 500,000 pounds of non-biodegradable glycol. Other approaches are use of individual packs of dry ice in a single shipment, which does not provide a scalable economic model for large scale trans port over long distances.

Thus, an objective of an embodiment of the refrigerated, thermally insulated, collapsible cover assembly and method of using to transport perishable products is to provide a lightweight and durable product container and temperature control system capable of keeping large volumes of products at a desired temperature from point of shipping to point of delivery over extended periods of time within the new strictures of the FSMA, and similar regulations.

Yet another principal objective of an embodiment of the refrigerated, thermally insulated, collapsible cover assembly and method of using to transport perishable products is to provide an efficient and inexpensive design, from the stand point of both the cost of the materials and the quantity of materials used in manufacture of the refrigerated, thermally insulated, collapsible cover system, assembly, and method of use to transport products. The refrigerated, thermally insulated, collapsible cover system, assembly and method of use to transport perishable products is easily manufactured. Additionally, the refrigerated, thermally insulated, collapsible cover system, assembly and method of use to transport perishable products is readily assembled such that thermal problems are minimized during set-up and use. The refrigerated, thermally insulated, collapsible cover system, assembly and method of use is provided for transport and delivery of perishable products across many time zones and over thousands of miles.

A further objective of an embodiment of the refrigerated, thermally insulated, collapsible cover system, assembly and method of use to transport perishable products is to provide reusable and/or recyclable components which allow easy and low-cost transport when not in use. The reusable and/or recyclable components are made from light weight, strong materials where component structural integrity is a factor, and recycled or environmentally safe disposable products where component replacement is a factor.

Another objective of an embodiment of the refrigerated, thermally insulated, collapsible cover system, assembly and method of use to transport perishable products is to provide a thermally stable cover sized to conveniently and economically house a plurality of product packs arranged in a three-dimensional array upon a LD-7 container. The standard dimensions of the LD-7 metal base plate are 125 inches in length by 96 inches in width. Adding a 64-inch product packed pallet loading height specification provides a refrigerated, thermally insulated container volume of approximately 745 cubic feet to air transport perishable products and provide uniform thermal stability for the product packs from a point of shipping the product packs to a point of receiving the product packs.

DISCLOSURE OF INVENTION

The reusable, substantially airtight, and insulated cover assembly and method of using to transport perishable products improves upon the size, material strength, insulation properties, and internal cooling aspects of the prior art thermally insulated, collapsible cover assembly and method of using to transport perishable products, U.S. Pat. No. 8,250,835, and cooler box, U.S. Pat. No. 8,292,119. The reusable, substantially airtight, and insulated cover assembly and method of using to transport perishable products (hereinafter sometimes referred to as "Pro Pod™ 100") incorporates controlled chilled air circulation within the Pro Pod™ 100 sealed cover to maintain targeted temperature ranges for the product to be protected. Beyond the improved Pro Pod™ 100 cover materials, the principal advancements of the Pro Pod™ 100 over the prior art include, without limitation: 1) thermostatic control elements with variable setting ranges within a temperature control system/assembly; 2) a header assembly 130, received and supported by a refrigeration chamber 160, and including multiple air delivery manifolds or vents 132 and attached ducts 180; 3) a thermostatically controlled air circulation fan 136 for each air delivery manifold or vent 132 within the header assembly 130; 4) a central chamber ice box 152 with an exhaust duct 158 and a thermostatically controlled delivery fan 156 to feed a controlled flow of chilled air into the bottom of the header assembly 130; power supplies 170 and 172 for all fans and non-wireless temperature sensors within each Pro Pod™; 6) one or more temperature sensors within the Pro Pod™ 100 as part of the temperature control system/assembly; 7) least one microprocessor within the Pro Pod™ 100 as part of the temperature control system/assembly; and 8) at least twelve improved ice pouches within horizontal chambers on Pro Pod™ 100 assembled top panel 28 internal sides.

An embodiment of the Pro Pod™ is sized to incase at least five loaded standard pallets 420 at once and is designed to fit onto one LD-7 type airline base pallet 500, a standard freight container used in the air cargo industry. The LD-7 base pallet 500 is principally a metal plate and net, with the standard dimensions of the metal plate being 125 inches in length by 96 inches in width. Cargo is loaded onto the LD-7 plate to a height of 64 inches, providing a loaded LD-7 Pro Pod™ 100 volume of approximately 745 cubic feet.

An embodiment of the Pro Pod™ 100 provides a substantially airtight cover assembly having a detachable assembled bottom panel 20, a detachable assembled side panel 24, and a detachable assembled top panel 28. These panels are sized and folded to completely wrap and enclose four sides of a three-dimensional array of product boxes 400 upon a product pallet 420.

The detachable assembled top panel 28 further includes a plurality of top panel pouches 40 positioned within horizontal chambers on top panel inside surfaces, and pouch 40 exterior access flaps secured by means for hook and loop attachment. The top panel pouches 40 are sized to receive correspondingly sized blocks of dry ice.

Means for hook and loop attachment 200 is provided on four top edges of the detachable assembled side panel 24 and corresponding four detachable assembled top panel 28 flaps 125 allow the Pro Pod™ 100 detachable assembled side panel 24 top opening to be wrapped around and sealed over the four assembled top panel flaps 125 folded down over and covering the top sides of the product boxes 400. Each corner of the detachable assembled top panel 28 has a corner closure seal 127.

Means for hook and loop attachment 200 is provided on four bottom edges of the detachable assembled side panel 24 and corresponding four detachable assembled bottom panel 20 flaps 124 allow the bottom flaps 124 folded up over and covering the assembled side panel 24 surrounding the product boxes 400 and product pallets 420. Each corner of the detachable bottom panel 20 has a corner closure seal 126.

An embodiment of the Pro Pod™ 100 system, assembly, and method for providing a reusable, substantially airtight, and insulated container to safely transport non-frozen products provides the assembled bottom panel 20, the assembled side panel 24, and the assembled top panel 28 with inner surfaces 240 and outer surfaces 250 made from thermoplastic polyurethane nylon fabric bonded to a uniformly thick internal layer of insulation 260, and having sealed, hot-mold welded edges 270.

The Pro Pod™ 100 further includes a temperature control assembly/system 150 that includes:

1) thermostatic control elements with variable setting ranges within the temperature control system 150, 2) at least one header assembly 130 with multiple delivery manifolds or vents 132 and attached ducts 180;

3) at least one refrigeration chamber 160 sized to receive and support the at least one header assembly 130;

4) a thermostatically controlled air circulation fan 136 for each delivery manifold or vent 132 within the header assembly 130;

5) a central chamber ice box 152 with an exhaust duct 154 and a thermostatically controlled delivery fan 156 that feeds controlled flow of chilled air into the header assembly 130;

6) electrical circuitry integral to the central chamber ice box 152 and header assembly 130, integral programmable microprocessor temperature control systems, and integral power supplies 170 and 172 for all fans and other elements of the temperature control system/assembly requiring electrical power within each Pro Pod™; and 7) one or more temperature sensors 220 or 222 within the Pro Pod™ cover as part of the temperature control system/assembly.

BRIEF DESCRIPTION OF DRAWINGS

The above stated features, aspects, and advantages of the Pro Pod™ 100 will become better understood regarding the following description and accompanying drawings as further described.

FIG. 16A is a planar top view of the exterior of a first top panel portion 122 depicting panel flaps 125, panel corner seals 127, pouches 40, and means for hook and loop attachment 200 for an embodiment of the Pro Pod™ 100 system and assembly for packaging and preserving products for transport.

FIG. 16B is a planar top view of the exterior of a second top panel portion 123 depicting panel flaps 125, panel corner seals 127, pouches 40, and means for hook and loop attachment 200 for an embodiment of the Pro Pod™ system and assembly for packaging and preserving products for transport.

FIG. 16C is a left front perspective view of the interior of assembled top panel 28 for an embodiment of the Pro Pod™.

FIG. 17A is a planar top view of a side panel side portion 121 depicting means for hook and loop attachment 200 around the interior periphery for an embodiment of the Pro Pod™.

FIG. 18A is a planar bottom view of the exterior of a first bottom panel portion 118 depicting panel flaps 124, panel corner seals 126, and means for hook and loop attachment 200 for an embodiment of the Pro Pod™.

FIG. 18B is a planar bottom view of the exterior of a second bottom panel portion 119 depicting panel flaps 124, panel corner seals 126, and means for hook and loop attachment 200 for an embodiment of the Pro Pod™.

FIG. 18C is a left front perspective view of the interior of assembled bottom panel 20 for an embodiment of the Pro Pod™.

FIG. 21 is a detailed perspective view of the assembled top panel pouch 40 depicting an internal mesh box 44 and pouch bottom vent strip 42 within horizontal chambers on top panel inside surfaces for an embodiment of the Pro Pod™.

FIG. 22 is a representative panel cross sectional view of FIG. 15 taken at "22-22" depicting a panel inner surface 240, a panel outer surface 250, and insulation 260 for an embodiment of the Pro Pod™.

FIG. 23 is a representative panel cross sectional view of FIG. 12 taken at "23-23" depicting a panel inner surface 240, a panel outer surface 250, insulation 260, and a sealed, hot-mold welded panel edge 270 for an embodiment of the Pro Pod™.

BEST MODE FOR CARRYING OUT THE INVENTION

Figure 1:
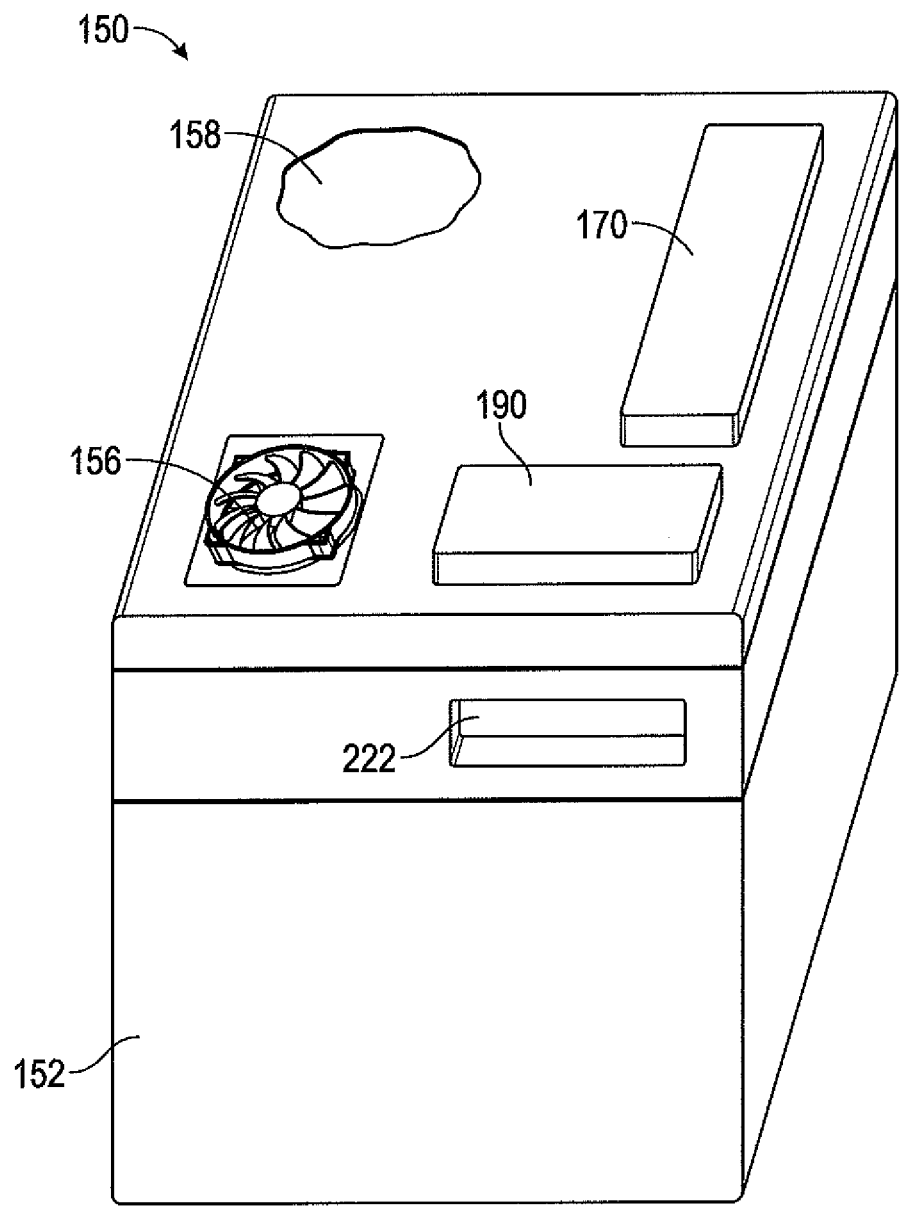
FIG. 1 is a perspective view of elements of an embodiment of the Pro Pod™ depicting a portion of the central temperature control assembly/system 150 providing a central ice chamber box 152, at least one integral microprocessor controllable delivery fan 156, an integral power supply 170, at least one integral chamber exhaust port 154, an integral microprocessor 190, and at least one integral temperature measuring device 222.

Referring more specifically to the drawings, for illustrative purposes elements of the Pro Pod™ 100 are embodied generally in FIGS. 1-25. The Pro Pod™ 100 may vary as to configuration and as to the details of the parts, and the method of using the Pro Pod™ 100 may vary as to details and to the order of steps, without departing from the basic concepts as disclosed. The Pro Pod™ 100, assembly, system and method of use thereof, are disclosed generally. However, the disclosed Pro Pod™ 100, assembly and system, and the method for using the Pro Pod™ 100, may be used in a variety of applications, as will be clear to those skilled in the art.

An embodiment of the Pro Pod™ 100 includes two equal sized collapsible bottom panel portions, 118 and 119, FIGS. 18A and 18B. Each collapsible panel portion has an interior surface and an exterior surface, means for hook and loop attachment 200 around an interior surface periphery, and one portion having an exterior surface periphery length with means for hook and loop attachment. Thus, a length of a first collapsible panel portion 118 internal surface periphery means for hook and loop attachment 200 is affixed to a corresponding length of a second collapsible panel portion 119 external surface periphery means for hook and loop attachment providing an assembled bottom panel 20, FIGS. 7-15, and 18C, having interior and exterior surfaces. The assembled bottom panel 20 provides an assembled bottom panel 20 exterior surface sized to be placed upon and cover a top surface of a base pallet 500 comprising a substantially rectangular boundary, FIGS. 7-15. The assembled bottom panel 20 exterior surface is further sized to extend beyond the base pallet 500 rectangular boundary. The assembled bottom panel 20 further provides four flaps 124 sized to be folded on an edge to extend orthogonally upward from the base pallet 500, FIGS. 7-15, and 18A-18C. Each assembled bottom panel 20 flap includes a corner seal 126 for hook and loop attachment on each assembled bottom panel 20 corner.

For an embodiment of the Pro Pod™ 100, means for hook and loop attachment 200 is heavy duty, industrial strength Velcro®.

An embodiment of the Pro Pod™ 100 also includes a central temperature control assembly/system 150 providing: i) at least one integral power supply 170; ii) at least one integral temperature measuring device 222 connected to at least one integral microprocessor 190 by electrical circuitry; iii) at least one integral thermostatically controlled variable speed fan 156 and at least one integral central ice chamber box 152 housing dry ice; iv) at least one integral microprocessor 190; v) integral electrical circuitry interconnecting the at least one integral power supply 170, the at least one integral thermostatically controlled variable speed fan 156 air circulation assembly, at least one integral temperature measuring device 222, and the at least one integral microprocessor 190; and vi) at least one integral exhaust port 158, FIG. 1.

Figure 5:
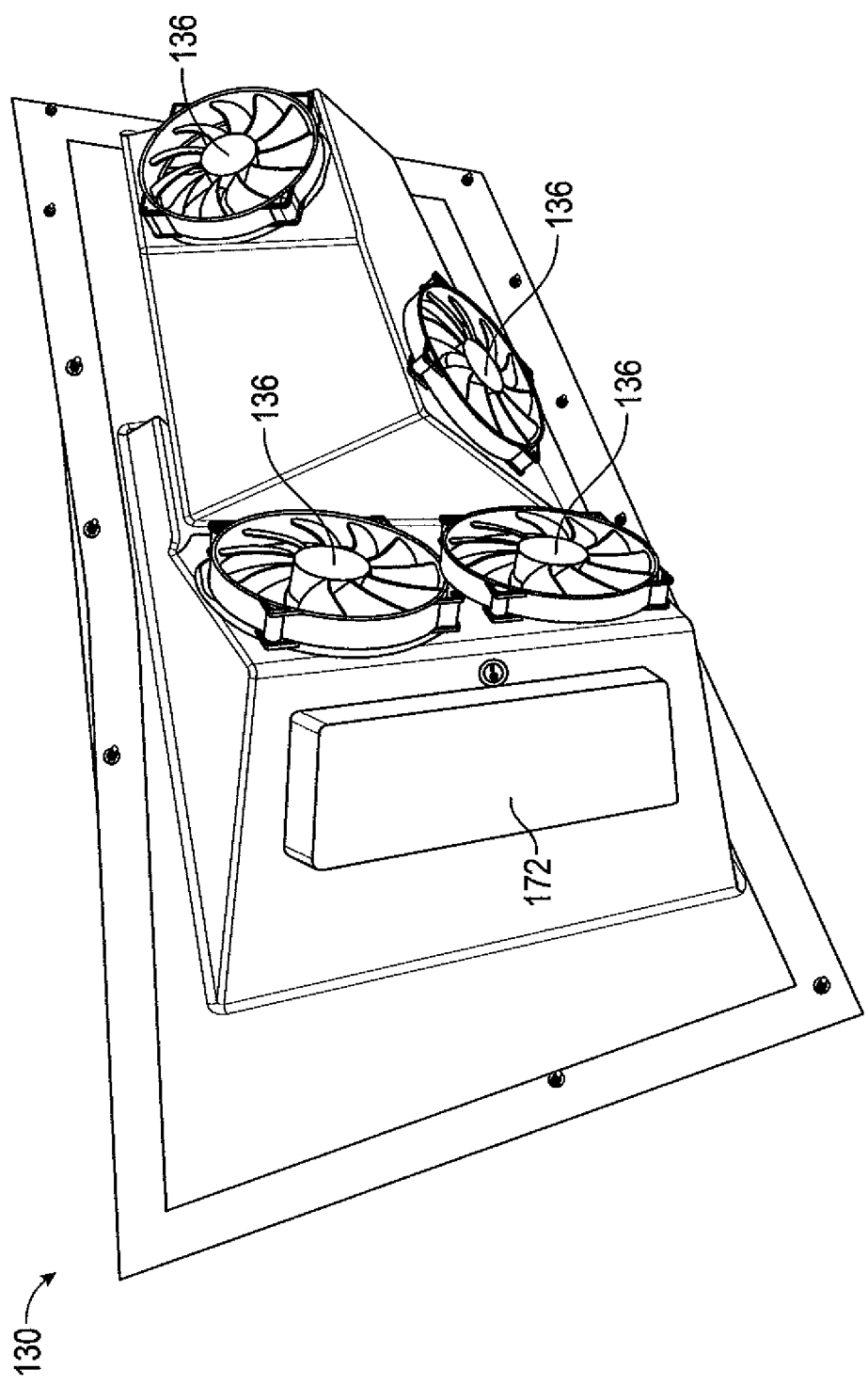
FIG. 5 is a bottom left side perspective view of elements of an embodiment of the Pro Pod™ depicting the header assembly 130 of FIG. 3 having a plurality of integral thermostatically controlled header delivery fans 136 associated with the plurality of integral header vents, and an integral power supply 170.
Figure 6:
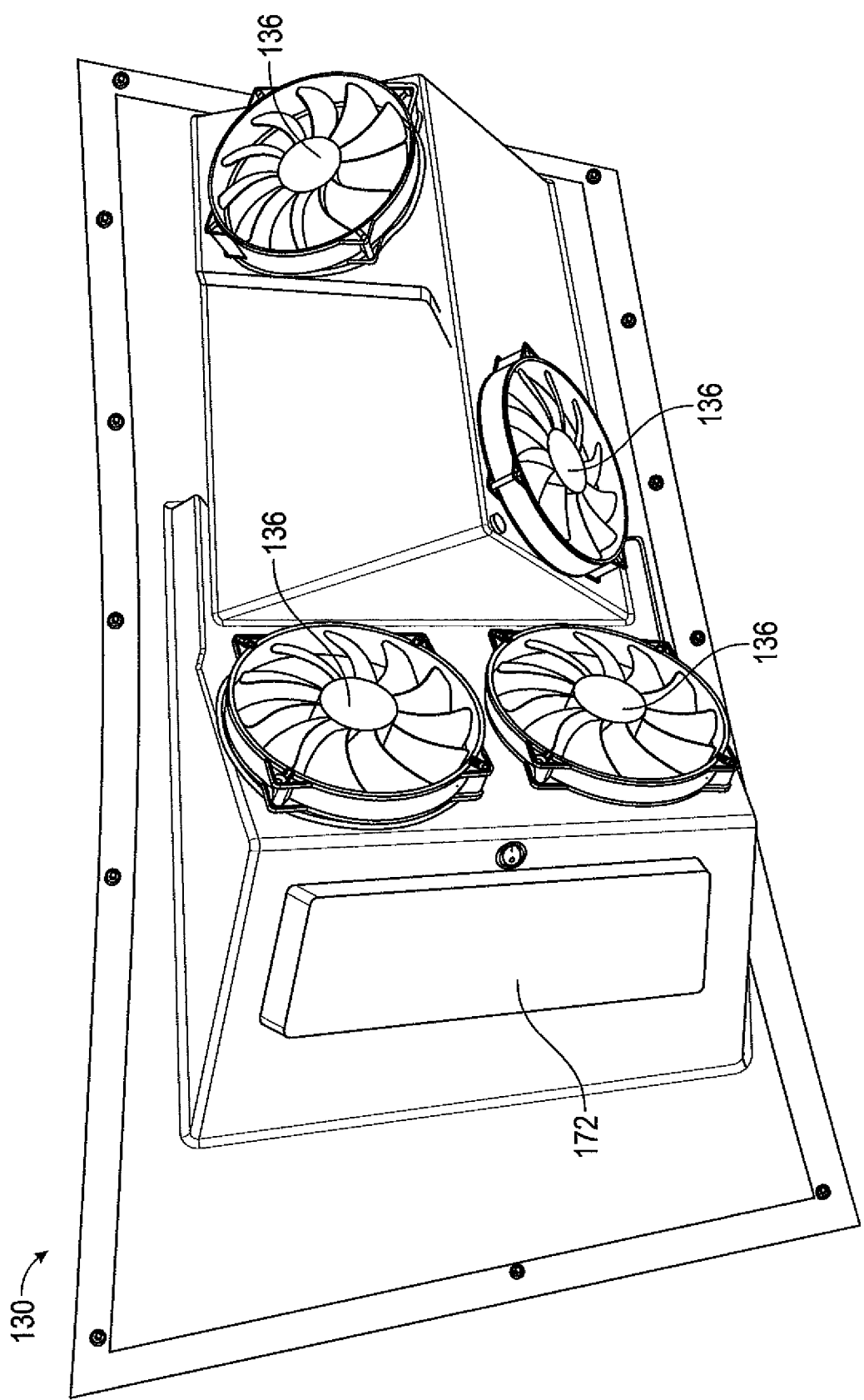
FIG. 6 is an alternative bottom left side perspective view of FIG. 5.

An embodiment of the Pro Pod™ 100 further provides at least two integral power supplies 170 and 172, FIGS. 1, and 5-6, having rechargeable nickel-metal hydride batteries. A resettable fuse provided in series with the power supply 170 and 172 battery cell, particularly of the bimetallic strip type, increases safety.

An embodiment of the Pro Pod™ 100 further provides at least one integral power supply 170 and integral electrical circuitry to support the integral microprocessor 190 and the at least one integral thermostatically controlled variable speed fan 156, FIG. 1, and at least one integral power supply 172 and integral electrical circuitry to support the integral microprocessor 192 and the at least one integral thermostatically controlled header delivery variable speed fan 136, FIGS. 3-6. This integral electrical circuitry to support the integral microprocessors 190 and 192 will use at least one wired temperature sensor 222 to ensure that circulating outgoing air from the refrigeration chamber 160 is not too cold and incoming air into the refrigeration chamber 160 is not too hot. The integral microprocessor 190 associated electrical circuitry connections regulate the at least one integral central ice chamber box 152 thermostatically controlled fan 156, to control the flow of chilled air within the central ice chamber box 152, and regulate the temperature throughout the Pro Pod™ 100 by the at least one integral central ice chamber box 152 thermostatically controlled delivery fan 156 to operate more efficiently for a guaranteed continuous run time of sixteen (16) hours, FIGS. 1-6, and 24. The integral microprocessors 190 and 192 further provide data collection capabilities and temperature monitoring and control algorithms to further optimize the Pro Pod™ 100 system with each iterative use. The integral microprocessor 190 controlled circuitry is applicable to Pro Pod™ 100 embodiments adapted to the LD7 base pallet 500, or to Pro Pod™ 100 embodiments adapted to the single pallet system of U.S. Pat. No. 8,250,835, or similar systems.

An embodiment of the Pro Pod™ 100 further includes the at least two integral thermostatically controlled variable speed fans 136 and 156 to provide fan speed that is automatically adjusted to accommodate for voltage sag, so fan speed can remain constant through a shipment, even as power supply 170 and/or 172 voltage begins to drop, FIGS. 1, 3-6.

An embodiment of the Pro Pod™ 100 includes integral microprocessor 190 control and delivery of chilled air from the chamber box 152 by the integral thermostatically controlled variable speed fan 156 and the integral chamber box exhaust port 158. This flow of chilled air from the integral chamber box exhaust port 158 is directed into the bottom of the header assembly 130.

The control and circulation of chilled air throughout the Pro Pod™ 100 is also provided by integral microprocessor 192 and the integral thermostatically controlled variable speed delivery fans 136 in the header assembly 130, and the header assembly air delivery manifolds 132 and header delivery ducts 180, FIGS. 3-6, 13, and 24.

An embodiment of the Pro Pod™ 100 provides at least one temperature measuring device that includes at least one temperature sensor 220 with a unitary power supply and wireless output communication signal capabilities, and the at least one integral microprocessor 190 or 192 for this embodiment further includes a wireless receiver to receive the wireless signal from the at least one temperature measuring device 220, FIGS. 1, 7, 9-12.

Figure 2:
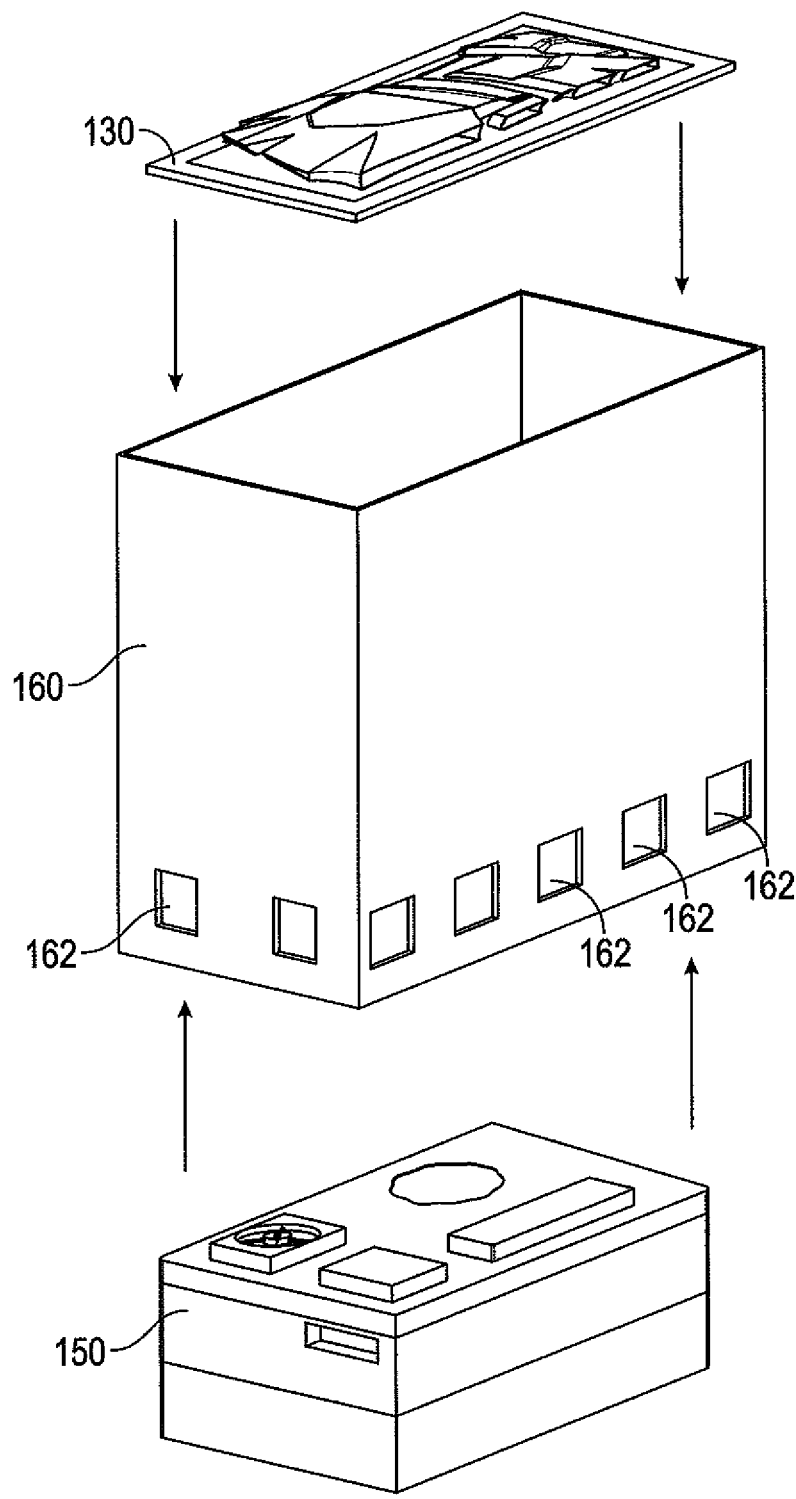
FIG. 2 is a perspective exploded view of elements of an embodiment of the Pro Pod™ depicting the portion of the central temperature control assembly/system 150 sized to fit within the refrigeration chamber 160 providing a plurality of chilled air intake openings 162 and that is sized to receive and support the at least one header assembly 130.
Figure 3:
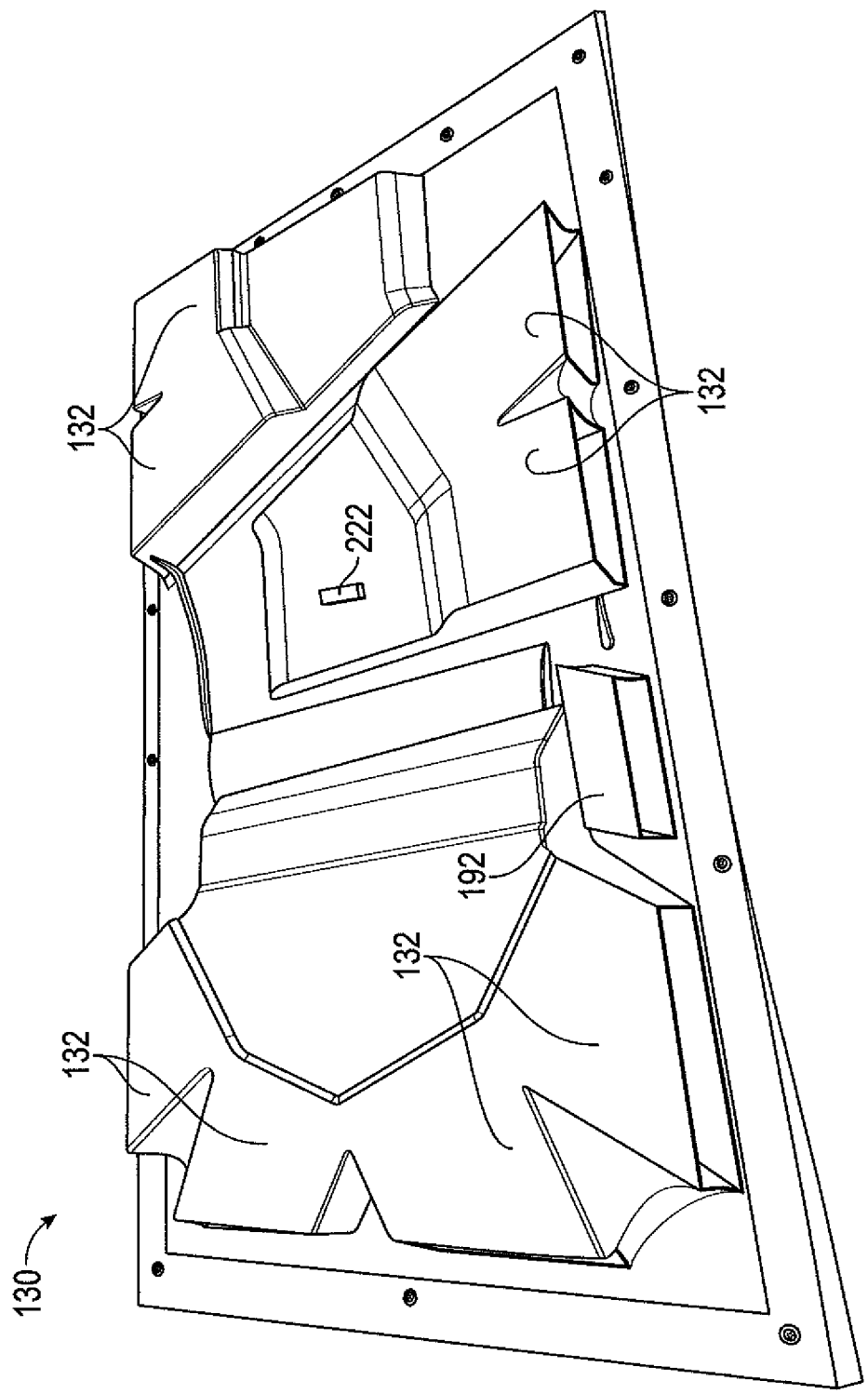
FIG. 3 is a top front perspective view of elements of an embodiment of the Pro Pod™ depicting a header assembly 130 having a plurality of integral header vents 132, an integral microprocessor 192, and at least one integral temperature measuring device 222.
Figure 4:
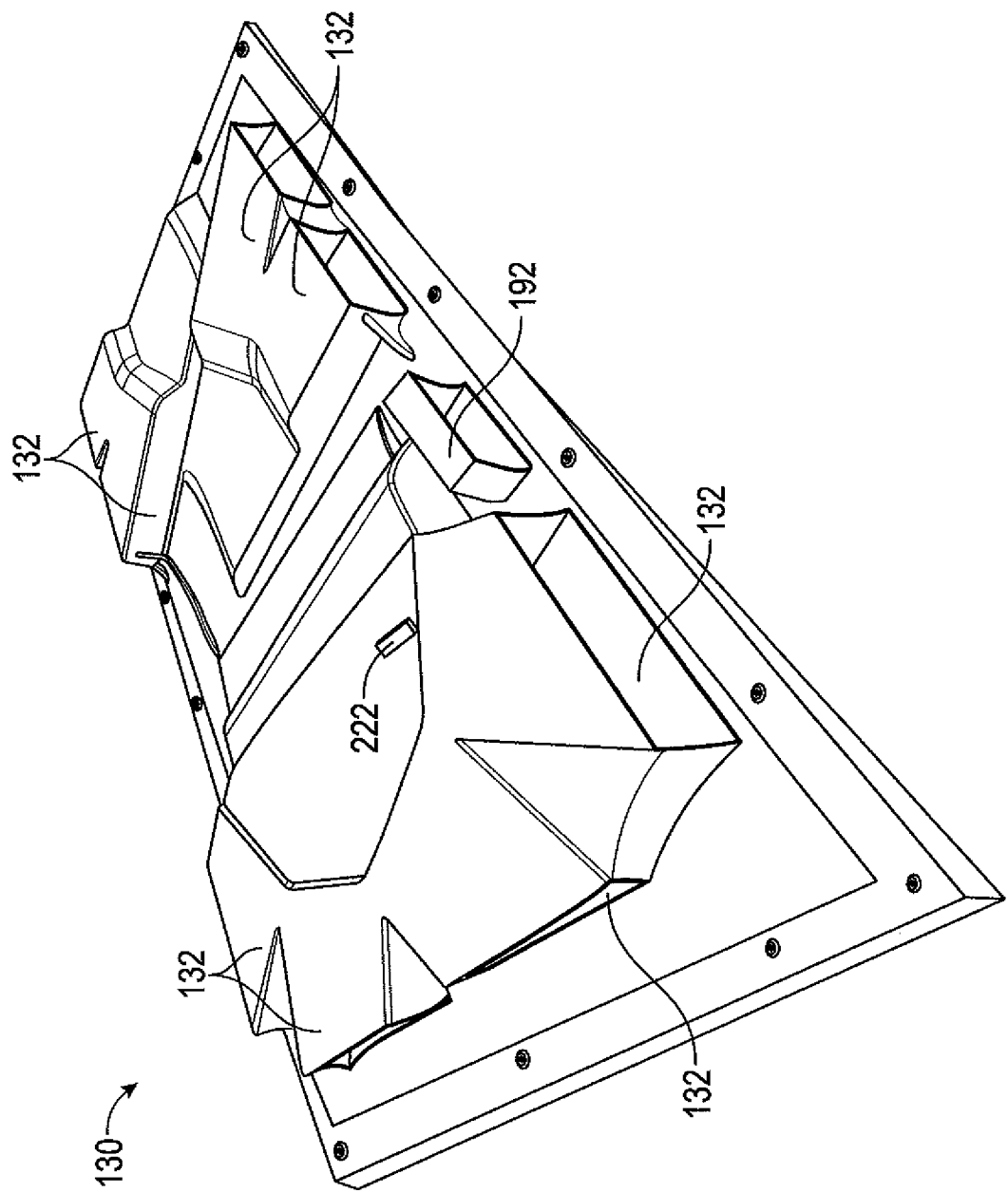
FIG. 4 is an alternative top left side perspective view of FIG. 3.

An embodiment of the Pro Pod™ 100 provides at least one temperature measuring device that includes at least one temperature sensor 222, FIG. 1, or 220 (not shown) within the interior cuboid space of the refrigeration chamber 160, and at least one temperature measuring device that includes at least one temperature sensor, 220, near the tops of product containers 400, FIGS. 7-12 outside the refrigeration chamber 160 or 222 on the top surface of the header assembly 130, FIGS. 3 and 4. These at least two temperature sensor locations provide the at least two integral microprocessors 190 and 192 with real time temperature readings to allow the temperature control and monitoring algorithms to regulate the at least one chamber box integral thermostatically controlled fan 156, control the flow of chilled air within the central ice chamber box 152, and regulate the temperature throughout the Pro Pod™ 100 by the central ice chamber box 152 thermostatically controlled delivery fan 156 and the at least one integral thermostatically controlled header delivery fan 136 speeds, allowing the entire Pro Pod™ 100 system to operate more efficiently for the desired guaranteed continuous transport run time, FIGS. 1-6, and 24.

An embodiment of the Pro Pod™ 100 further provides: a) at least one header assembly 130 with at least one integral air delivery manifold 132, and at least one integral header air delivery duct 180 attached to the at least one air delivery manifold 132; b) at least one thermostatically controlled air delivery fan 136 corresponding to each air delivery manifold 132 within the at least one header assembly 130; c) a refrigeration chamber 160 having a top opening sized to receive and support the at least one header assembly 130; d) the at least one central ice chamber box 152 further with at least one exhaust port 158 and at least one thermostatically controlled air delivery fan 156 to feed a controlled flow of chilled air from the at least one central ice chamber box 152 into the bottom of the at least one header assembly 130; and e) at least one microprocessor based memory and at least one processor configured by the at least one microprocessor memory to at least 1) receive real time temperature readings from the at least one temperature measuring device 220 or 222, and 2) maintain the temperature within the Pro Pod™ 100 system airtight container between a desired lower and upper temperature range, FIGS. 1-6, and 12. The at least one integral thermostatically controlled air delivery fan 156 is connected to and controlled by the at least one integral microprocessor 190, FIG. 1.

Besides the open top, sized to receive and support the at least one header assembly 130, the refrigeration chamber 160 provides four sides defining a substantially cuboid internal space, an open bottom sized to receive and house the at least one central ice chamber box 152 within the bottom portion of at least one refrigeration chamber 160 substantially cuboid internal space, and further comprising a plurality of equal sized and spaced openings 162 in the bottom portion of the refrigeration chamber 160 four sides, FIG. 2. The fit between the at least one header assembly 130 and the refrigeration chamber 160 is tight enough for the at least one header thermostatically controlled variable speed fan 136 to be able to both deliver chilled air from the header manifolds and ducts and suck chilled air into the refrigeration chamber through the equal sized and spaced openings 162 in the bottom portion of the refrigeration chamber 160 four sides. These equal sized and spaced openings 162 serve to direct the flow of chilled air drawn by the at least one header thermostatically controlled variable speed fan 136 from the space inside the Pro Pod™ 100 into the bottom of the refrigeration chamber 160. Thus, in addition to supporting the at least one header assembly 130 for an embodiment of the Pro Pod™ 100, the refrigeration chamber 160 receives inflow of chilled air from the bottom portion of internal the Pro Pod™ 100 and channels the chilled air back into the at least one header thermostatically controlled variable speed fan 136 of the at least one header assembly 130, FIGS. 2, 3-6 and 25, for controlled distribution across the tops of the of product containers 400 outside the refrigeration chamber 160.

An embodiment of the Pro Pod™ 100 further provides the at least one integral thermostatically controlled header air delivery fan 136 with variable speed fan blade rotational capabilities to optimize air flow and achieve desired temperatures within the Pro Pod™ 100 system airtight container. The at least one integral thermostatically controlled header air delivery fan 136 is connected to and controlled by the at least one integral microprocessor 192 in the header assembly 130. The at least one integral controlled header air delivery fan 136 provides fan speed that is automatically adjusted to accommodate for voltage sag, so fan speed can remain constant through a shipment, even as power supply 170 voltage begins to drop, FIGS. 3-6.

Figure 12:
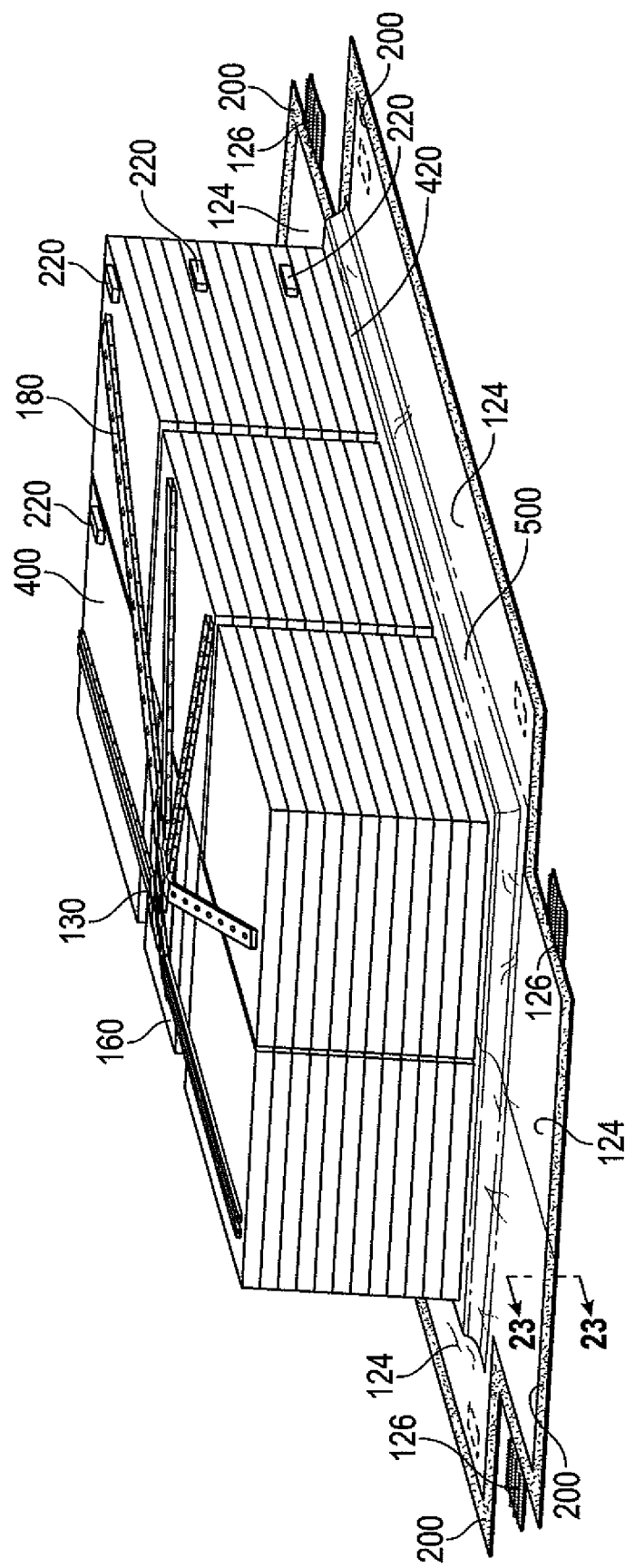
FIG. 12 is a perspective view of an embodiment of the Pro Pod™ of FIG. 11 depicting the header assembly 130 delivery ducts 180 disposed across the tops of the product containers 400.

An embodiment of the Pro Pod™ 100 further provides that the at least one header assembly 130 delivery ducts 180 are disposed across a substantially planar configuration of an array product containers 400 box top surfaces and under the inside surface of the assembled top panel 28, FIG. 12.

An embodiment of the Pro Pod™ 100 also provides two equal sized rectangular collapsible panel end cap portions 120 and two equal sized rectangular collapsible panel side portions 121, FIGS. 13-15 and 17A-17C. Each collapsible panel side portion 121 and collapsible end cap portion 120 are equal in height, and provide a top edge, a bottom edge, side edges, an interior surface and an exterior surface. Each collapsible panel side portion 121 includes means for hook and loop attachment 200 on the periphery of the interior surfaces and on the side and bottom peripheries of the exterior surfaces. Each collapsible end cap portion 120 further includes means for hook and loop attachment 200 on the periphery exterior surfaces and on the top periphery of the interior surfaces. By attachment of each collapsible end cap portion 120 exterior surface to a corresponding collapsible side portion 121 interior surface, an assembled side panel 24 is provided, FIGS. 17A-17C. The assembled side panel 24 includes an inside surface, an outside surface, a side panel top edge defining a rectangular top opening bounded by the assembled side panel 24 top edges and a side panel bottom edge defining a rectangular bottom opening bounded by the assembled side panel 24 bottom edges. The assembled side panel 24 likewise is sized to be folded around and enclose the array of filled boxes of product 400 and the temperature control assembly/system 150 on the assembled bottom panel 20 covering the base pallet 500, and folded around and enclose the assembled top panel flaps 125 closed over and down upon the assembled array of product containers 400, FIGS. 13-15 and 17A-17C.

An embodiment of the Pro Pod™ 100 also provides two equal sized collapsible top panel portions, 122 and 123, FIGS. 16A-16C. Each collapsible top panel portion, 122 and 123, includes an interior surface and an exterior surface, means for hook and loop attachment 200 around an interior surface periphery. One top panel portion further has an exterior surface length periphery with means for hook and loop attachment. Thus, a length of a first collapsible top panel portion 122 external periphery means for hook and loop attachment 200 is affixed to a corresponding length of the second collapsible top panel portion 123 internal periphery means for hook and loop attachment 200 providing an assembled top panel 28. The assembled top panel 28 includes an interior surface and an exterior surface, and further provides four flaps 125 sized to be folded on an edge to extend orthogonally downwards from a substantially flat, horizontal configuration of the assembled top panel 28 interior surface resting upon the header delivery ducts 180 and the substantially rectangular tops of product containers 400, the assembled top panel flaps 125 positioned to be bounded and covered by the assembled side panel 24 top edges, FIGS. 13-15. Each assembled top panel 28 flap 125 includes a corner seal 127 means for hook and loop attachment 200. FIGS. 13-15, 16A-16C, and 20.

The assembled top panel 28 further has a plurality of pouches 40 within horizontal chambers on the interior surface of the assembled top panel 28 flap 125, FIGS. 15-16C, and 21. Each pouch 40 is sized to receive and hold at least one block of dry ice. The fully assembled Pro Pod™ 100 provides chilled air from the blocks of dry ice housed in the pouches 40 to flow from the internal mesh box 44 throughout the Pro Pod™ sealed interior as distributed by the microprocessor controlled 192 header delivery fans 136, FIGS. 1-26.

Figure 13:
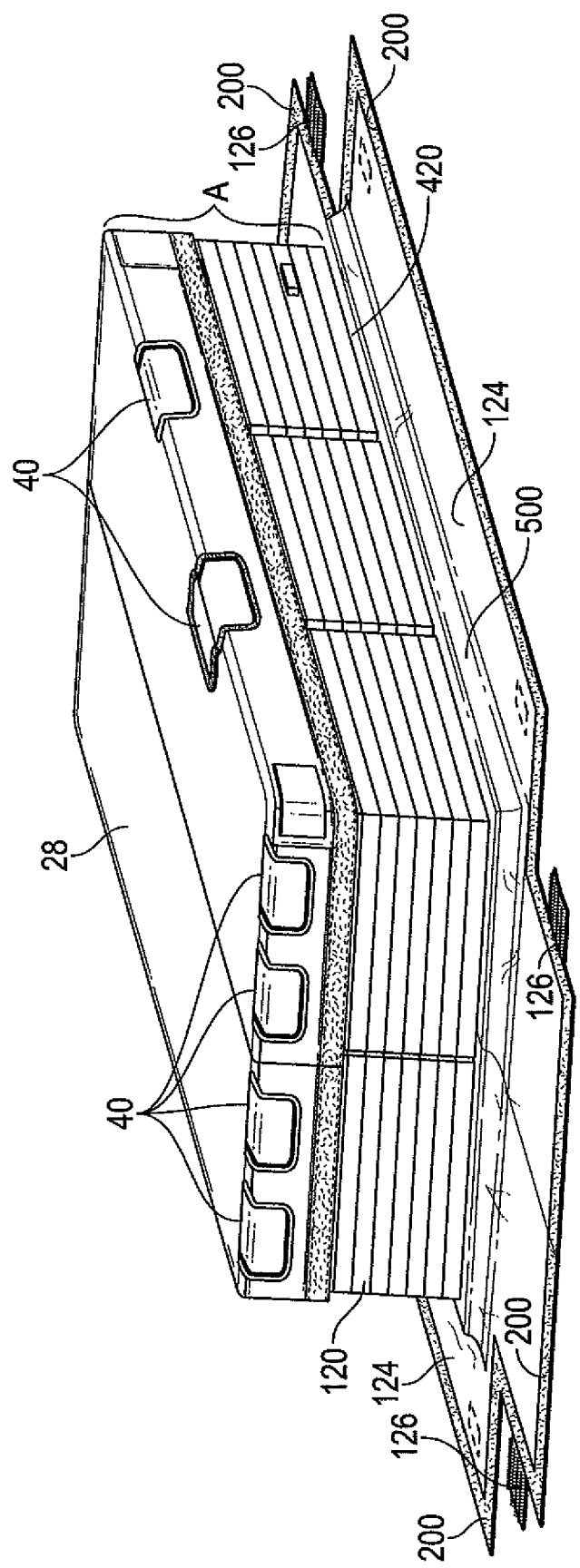
FIG. 13 is a perspective view of an embodiment of the Pro Pod™ of FIG. 12 depicting the assembled top panel 28 placed over the tops of the product containers 400 on the assembled bottom panel 20 with a uniform height of "A", with the assembled top panel flaps 125 folded down and over the top portion of the top sides of the product containers 400 and the assembled top panel corner seals 127 closed around each assembled top panel corner, and one pouch 40 external access flap opened.
Figure 14:
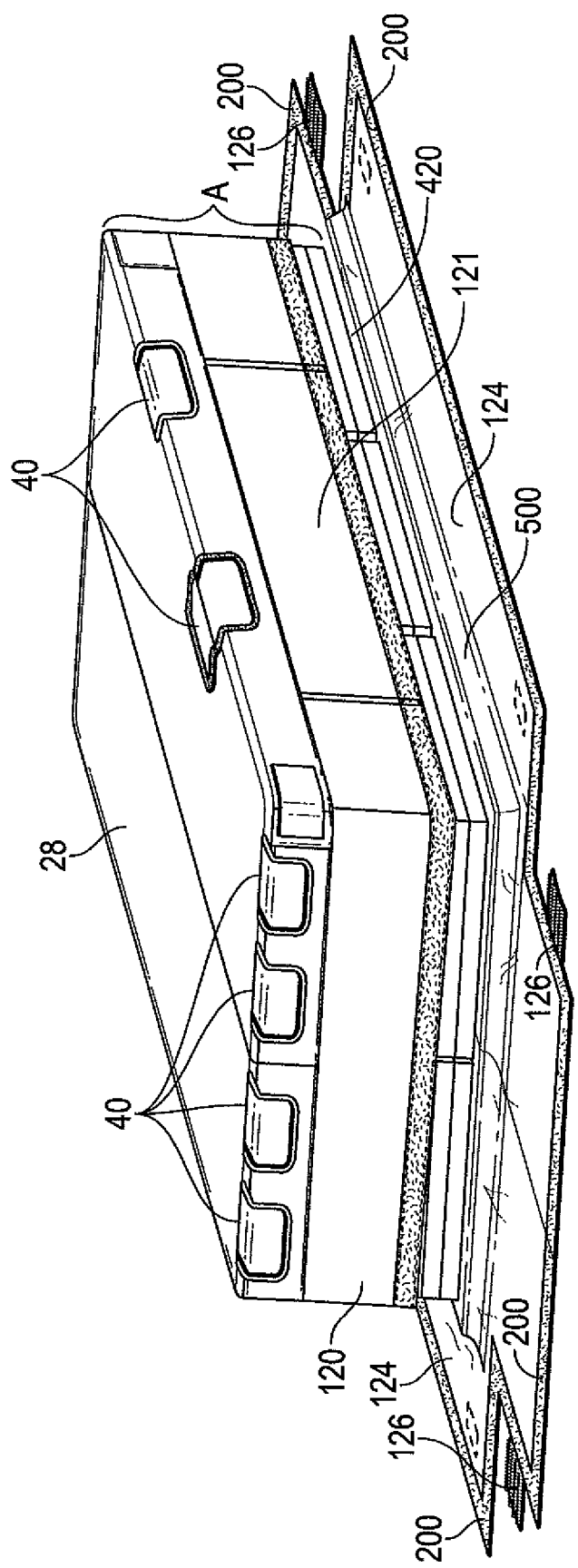
FIG. 14 is a perspective view of an embodiment of the Pro Pod™ of FIG. 13 depicting the assembled side panel 24 in place around the periphery of the of array of product containers 400 on the assembled bottom panel 20 with a uniform height of "A" and sealed over the assembled top panel flaps 125.
Figure 15:
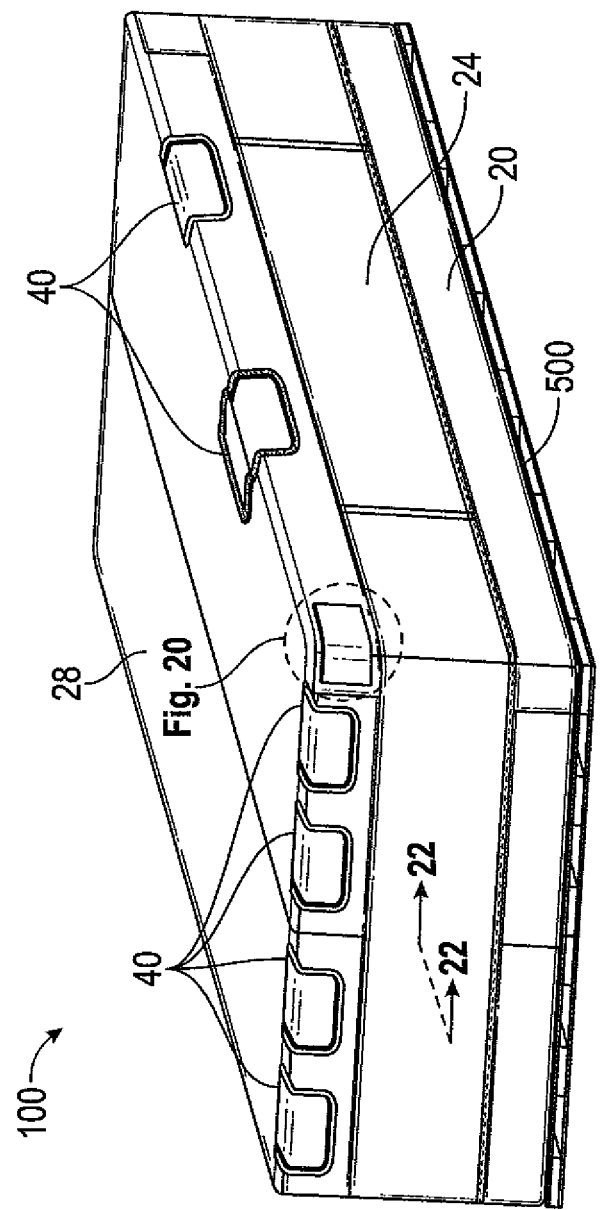
FIG. 15 is a perspective view of an embodiment of the Pro Pod™ 100 of FIG. 14 depicting the assembled bottom panel 20 flaps 124 folded up and sealed over the bottom portion of the assembled side panel 24 and the assembled bottom panel corner seals 126 closed around each assembled bottom panel corner.
Figure 17A:
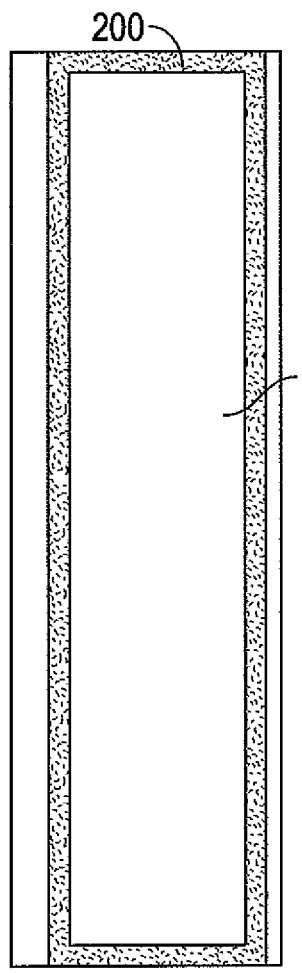
FIG. 17A is a planar top view of a side panel end cap portion 120 depicting means for hook and loop attachment 200 around the exterior surface periphery for an embodiment of the Pro Pod™.
Figure 17B:
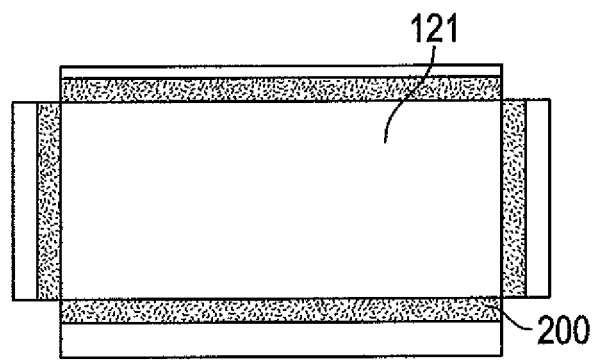
FIG. 17C is an exploded front left perspective view of the assembled side panel 24 depicting the positioning of the side panel end cap portions 120 and the side panel side portions 121 for an embodiment of the Pro Pod™.
Figure 17C:
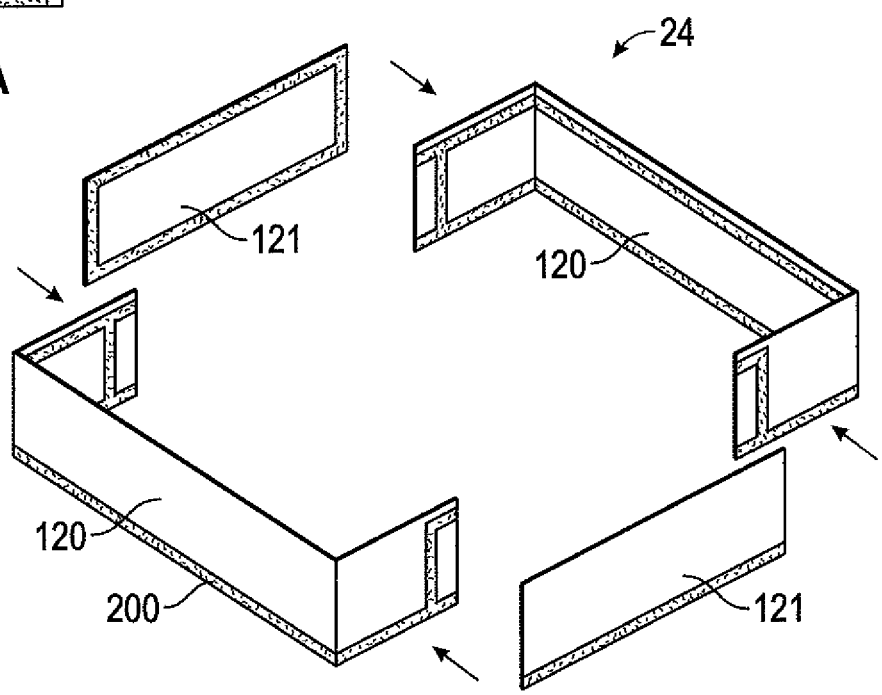
Figure 19:
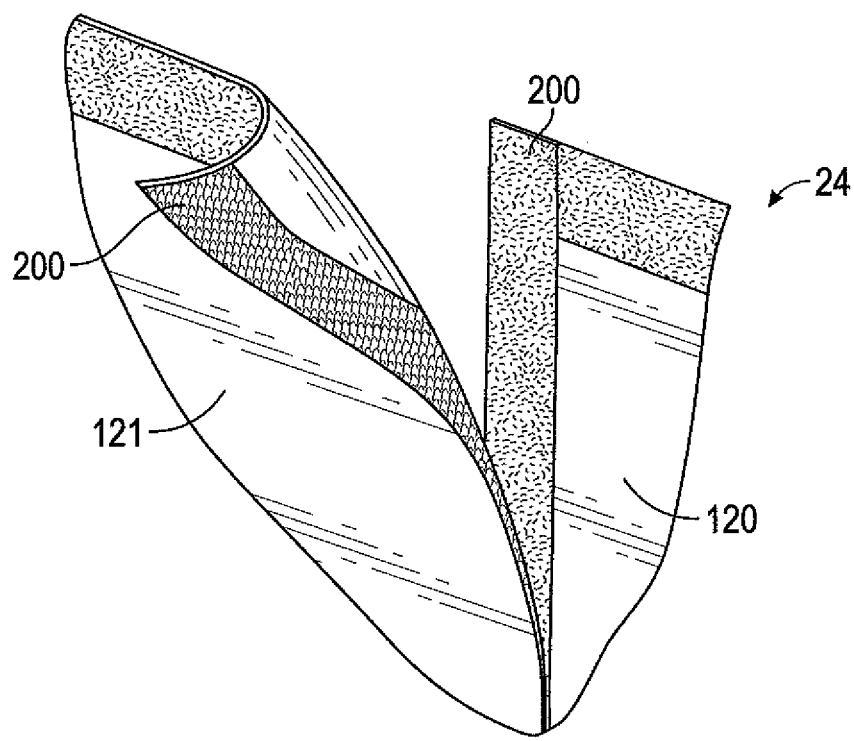
FIG. 19 is a perspective view of the means for hook and loop attachment 200 between the side panel end cap portion 120 and the side panel side portion 121 for an embodiment of the Pro Pod™.

Each pouch 40 has an external access flap sealed by mean for hook and loop fasteners, FIGS. 13-15. The pouch external access flap and pouch walls on the inside of the assembled top panel have panel surfaces and insulation consistent with the assembled top, side and bottom panels, see e.g. FIGS. 22 and 23, to eliminate any direct dry-ice contact with, and resultant cold damage to, the products in containers 400.

In an embodiment of the Pro Pod™ 100, the substantially rectangular configuration of product container 400 tops above the assembled side panel 24 top edge is closed and sealed within the assembled top panel 28 by folding the four, extended assembled top panel flaps 125 orthogonally downwards from the substantially flat, horizontal configuration of the top panel resting upon the container 400 tops to cover the assembled side panel 24 top edges. The assembled top panel flap corner seal 127 on each assembled top panel 28 corner is closed securing the assembled top panel 28 over the container 400 tops, FIGS. 14-16C and 20.

In an embodiment of the Pro Pod™ 100, the substantially rectangular bottom opening periphery bounded by the assembled side panel 24 bottom edge is closed within the assembled bottom panel 20 interior surface by folding the four extended bottom panel flaps 124 orthogonally upwards from the base pallet. The means for hook and loop attachment 200 on the assembled bottom panel 20 interior surface is engaged with means for hook and look attachment 200 on the outside surfaces of the assembled side panel 24. The flap corner seal 126 on each collapsible bottom panel corner is closed, securing that part of the assembled bottom panel 20 interior surface over the assembled side panel 24, whereby a reusable, substantially airtight container to transport the non-frozen products is obtained, FIGS. 7-15, and 18A-18C.

Figure 20:
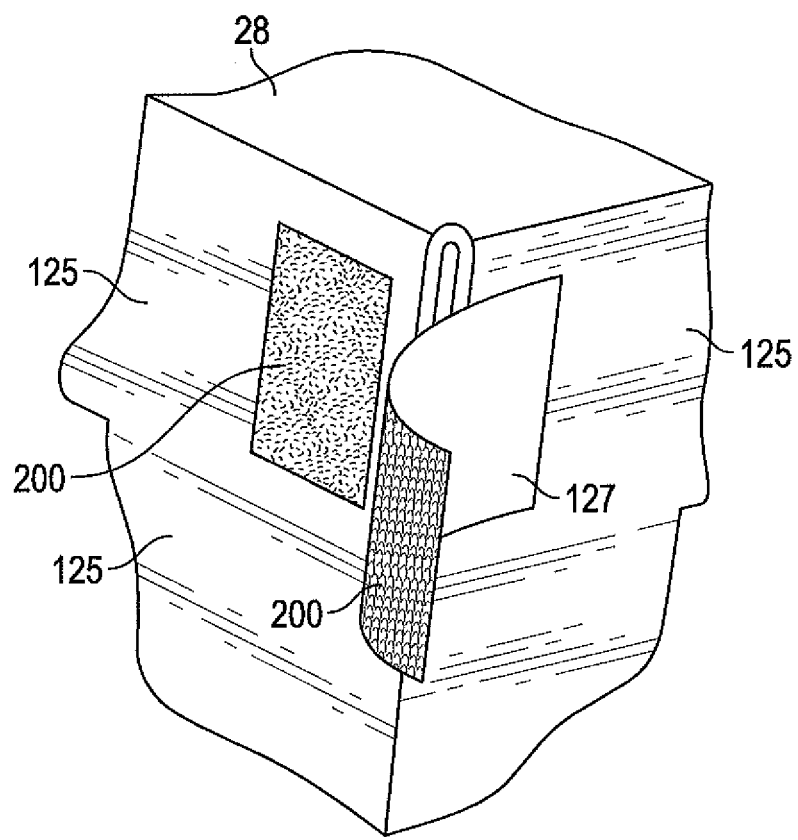
FIG. 20 is a detailed perspective view of FIG. 15 taken at "20-20" of the means for hook and loop attachment 200 for the assembled top panel 28 corner seal 127 between assembled top panel flaps 125, closing the assembled top panel 28 for an embodiment of the Pro Pod™.
Figure 24A:
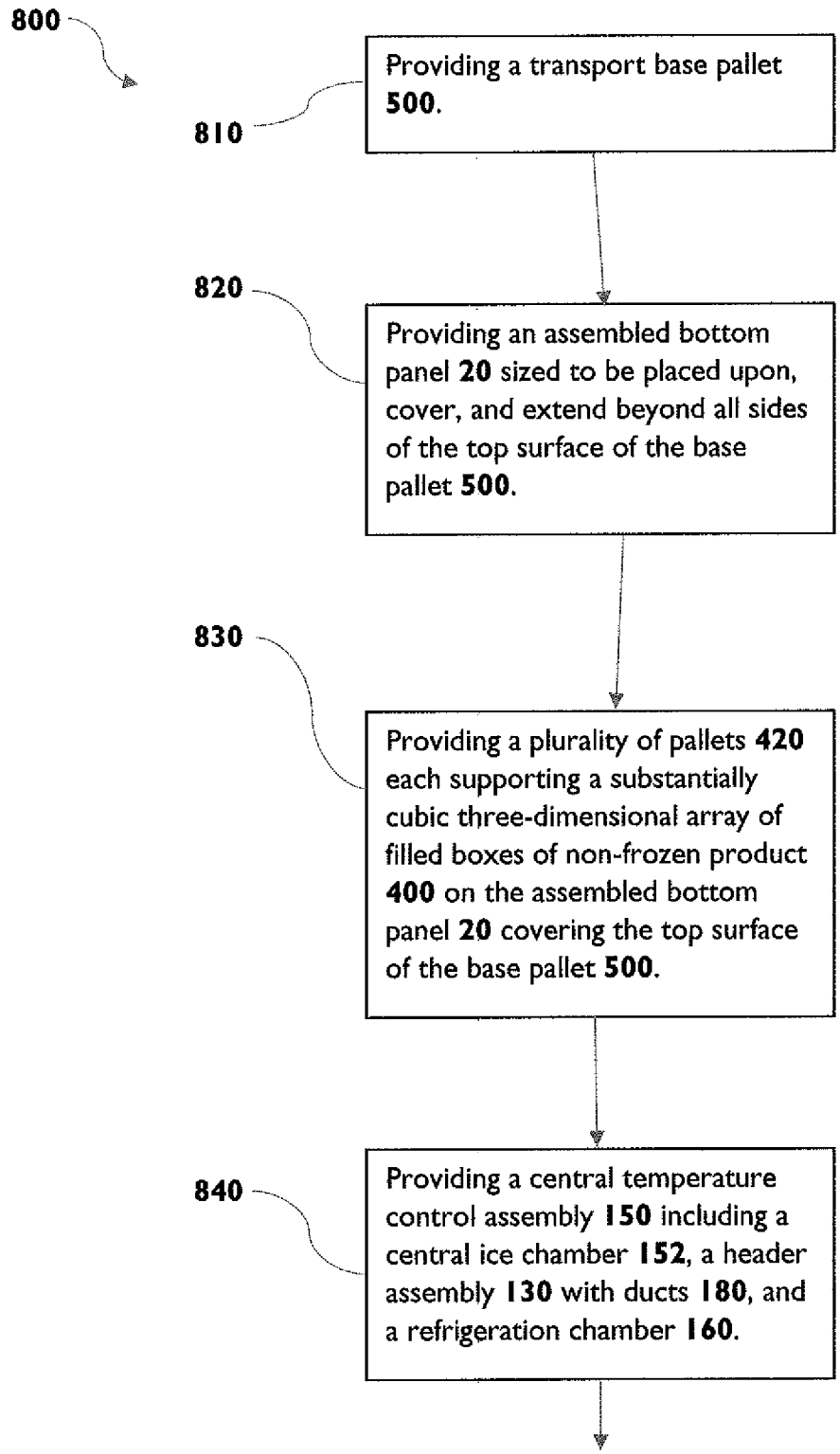
FIGS. 24A-24C depict the steps for a method of use an embodiment of the Pro Pod™.
Figure 24B:
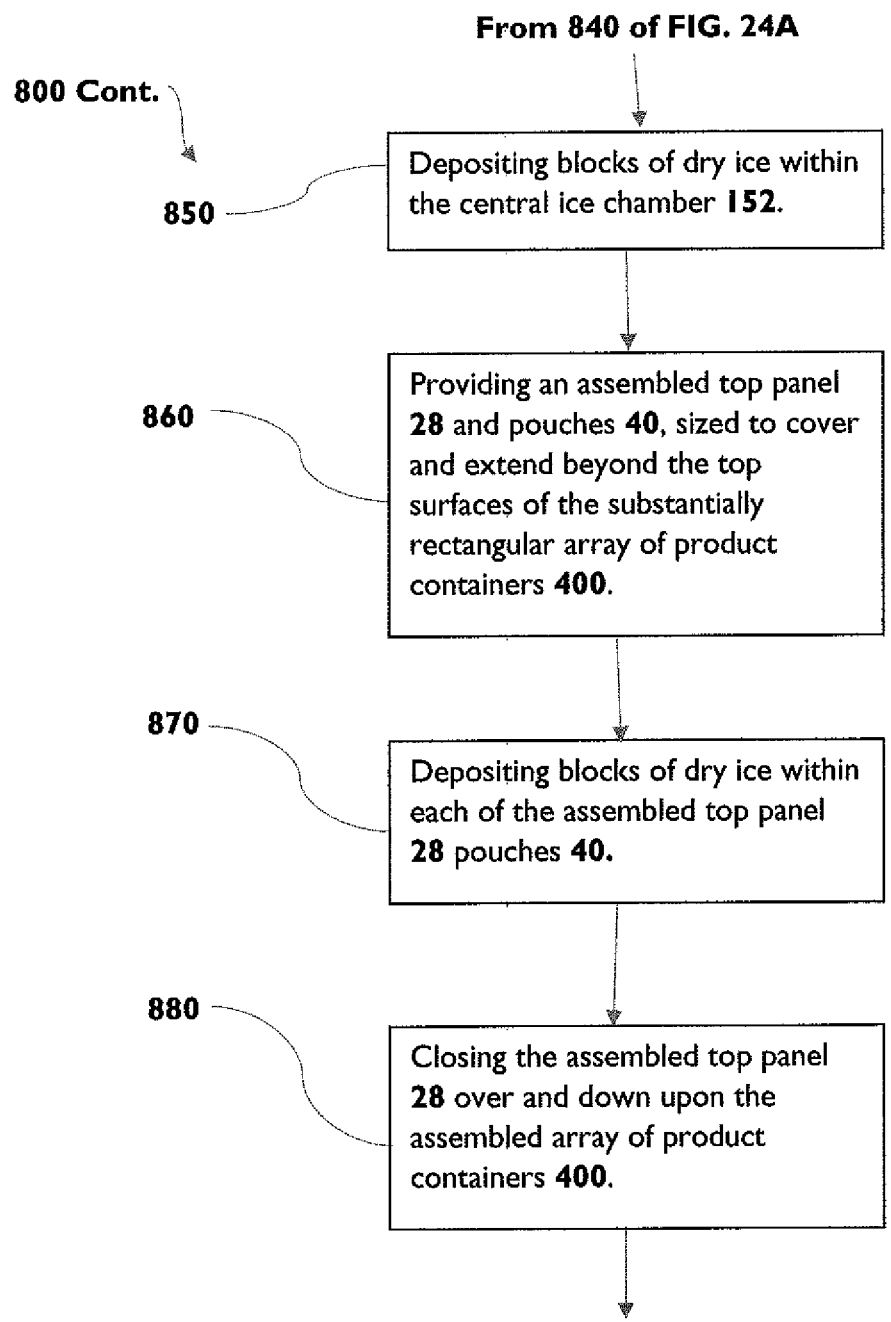
Figure 24C:
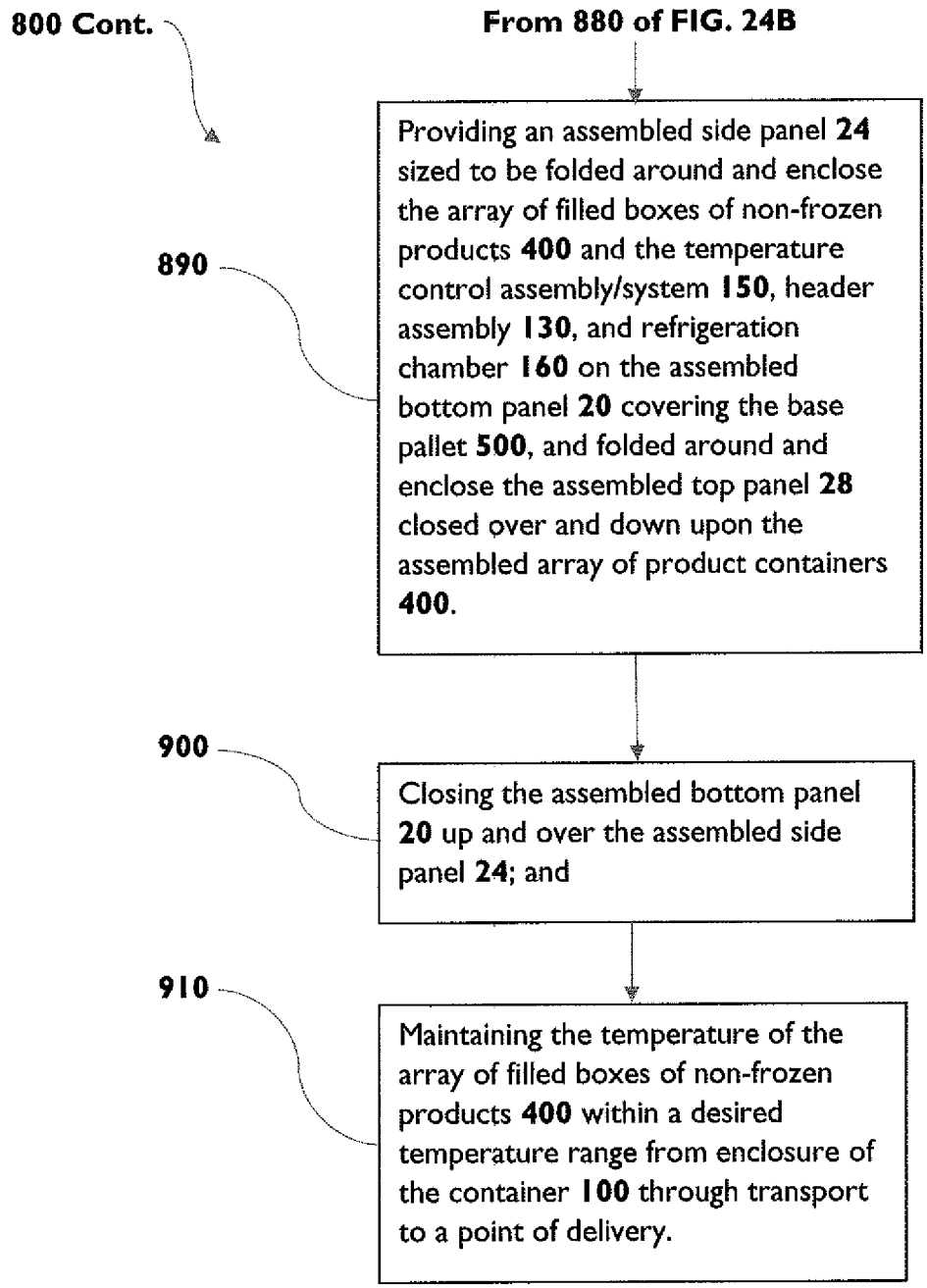

Though not depicted in the drawing figures, it would be understood by a person having ordinary skill in the art that the assembled bottom panel flap corner seal 126 on each assembled bottom panel 20 corner is closed securing the assembled bottom panel 20 over the assembled side panel 24 much in the same fashion as the assembled top panel flap corner seal 127 on each assembled top panel 28 corner is closed securing that part of the assembled bottom panel 20 over the assembled top panel flap 125 as depicted in FIG. 20.

It is further understood by those having ordinary skill in the art, there is adequate space between the internal surfaces of the assembled side panel 24 and the assembled top panel 28 of the of the Pro Pod™ 100 substantially airtight container and the array of pallets of product boxes 400 to allow the thermostatically controlled flow of chilled air throughout the inside of the container, see, e.g. FIGS. 7, 13-15, and 25, and around the pallets of products 400.

Figure 7:
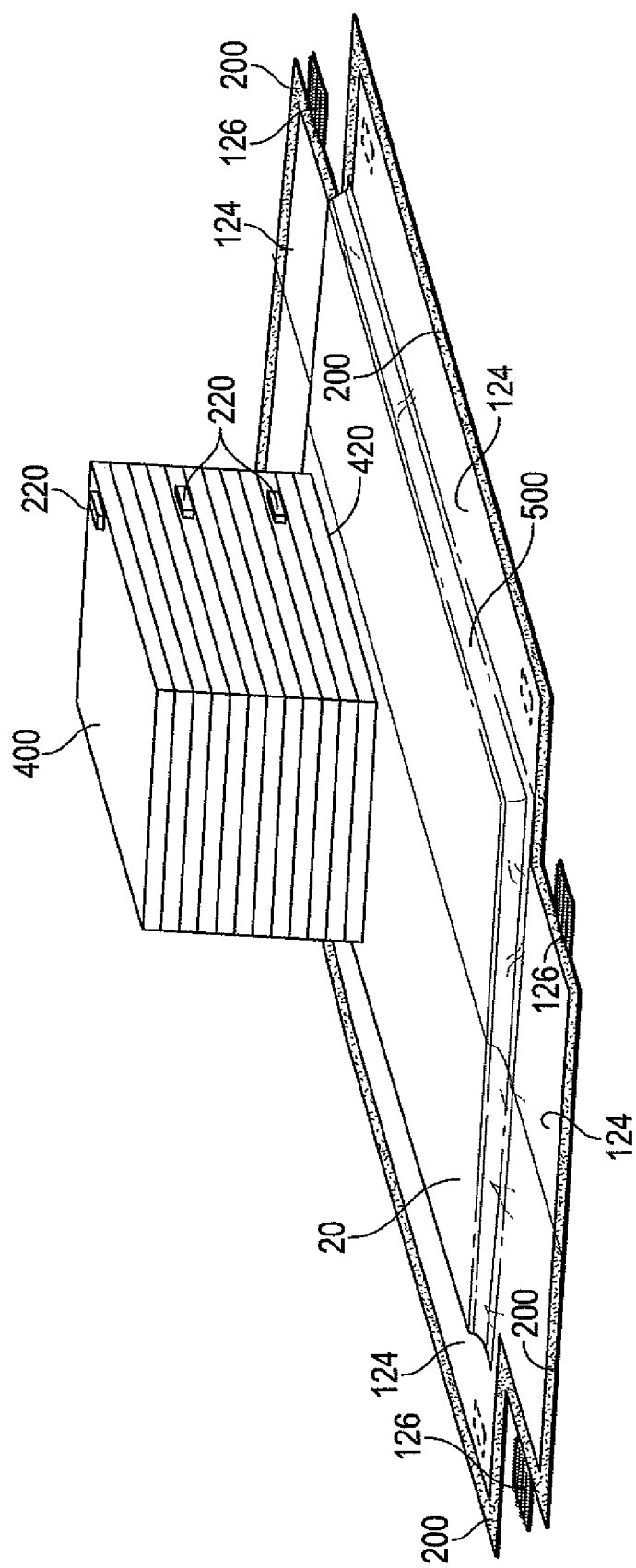
FIG. 7 is a perspective view of elements of an embodiment of the Pro Pod™ depicting the assembled bottom panel 20, assembled bottom panel flaps 124 and assembled bottom panel corner seals 126, positioned upon one LD-7 type airline container 500, and a pallet 420 loaded with perishable products containers 400 on the assembled bottom panel 20, and a plurality of temperature measuring devices with wireless transmitters 220.
Figure 8:
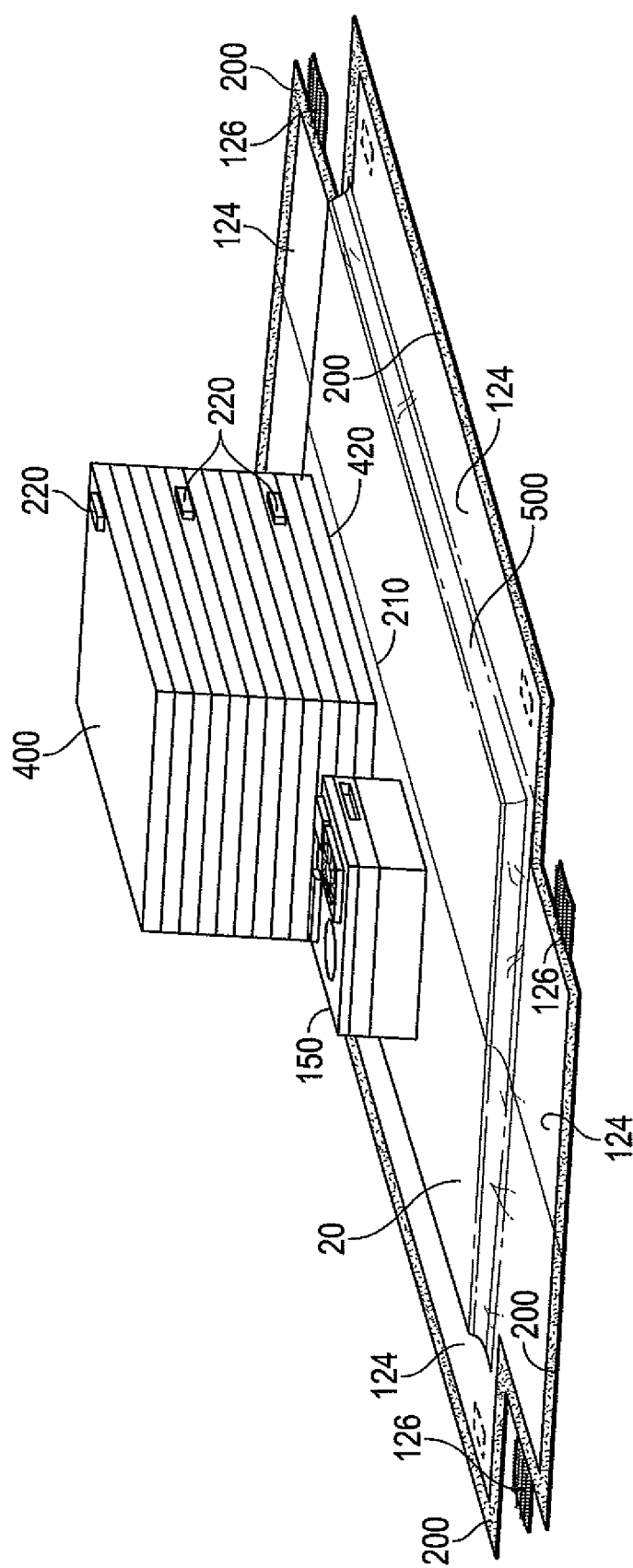
FIG. 8 is a perspective view of the embodiment of the Pro Pod™ of FIG. 7, further depicting the portion of the temperature-controlled assembly/system 150 on the assembled bottom panel 20.
Figure 9:
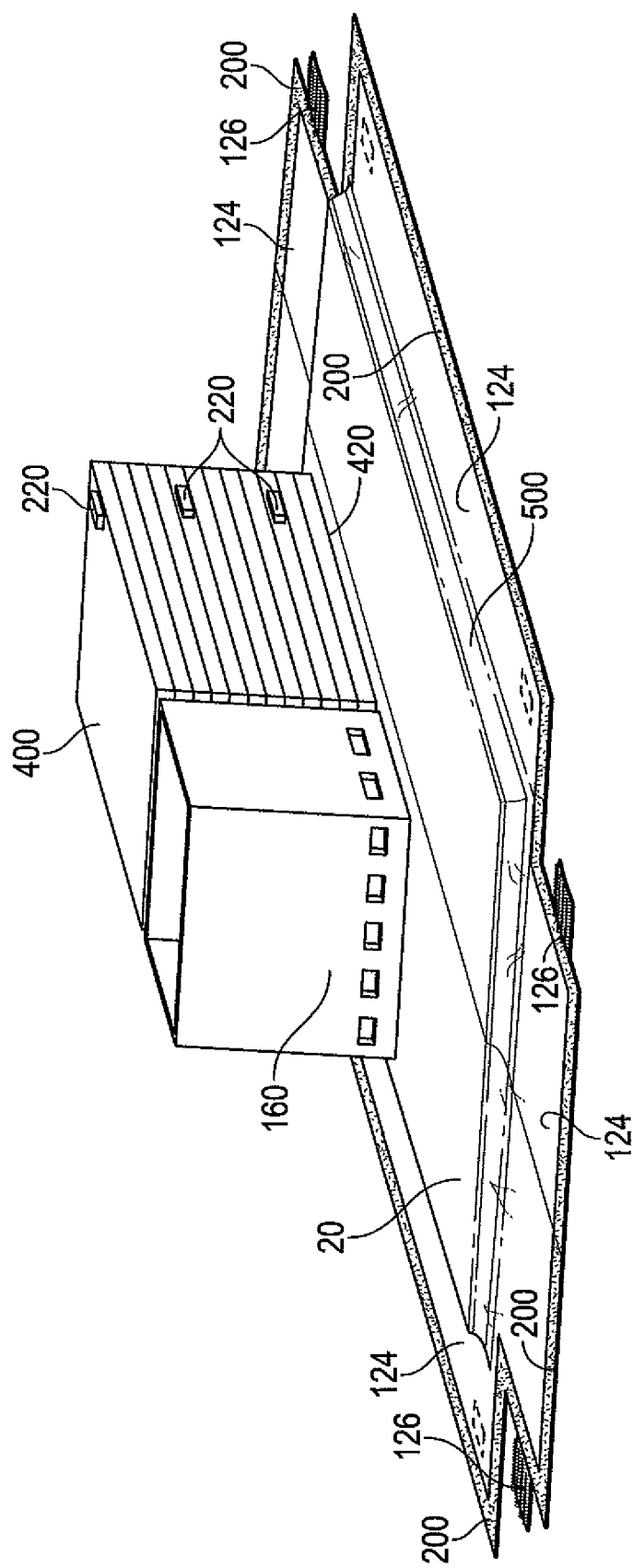
FIG. 9 is a perspective view of an embodiment of the Pro Pod™ of FIG. 8, further depicting the refrigeration chamber 160 placed over a portion of the temperature-controlled assembly/system 150.
Figure 10:
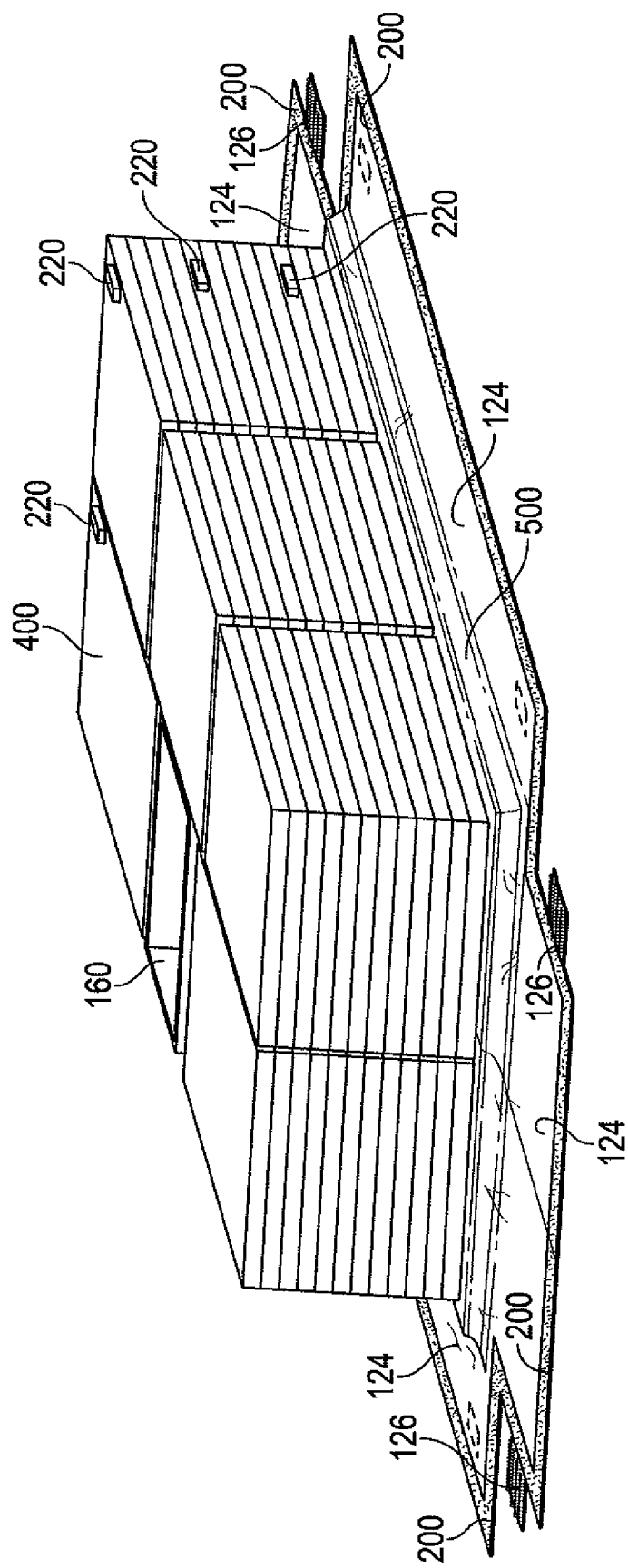
FIG. 10 is a perspective view of an embodiment of the Pro Pod™ of FIG. 9 depicting additional receiving pallets 420 loaded with perishable product containers 400.
Figure 11:
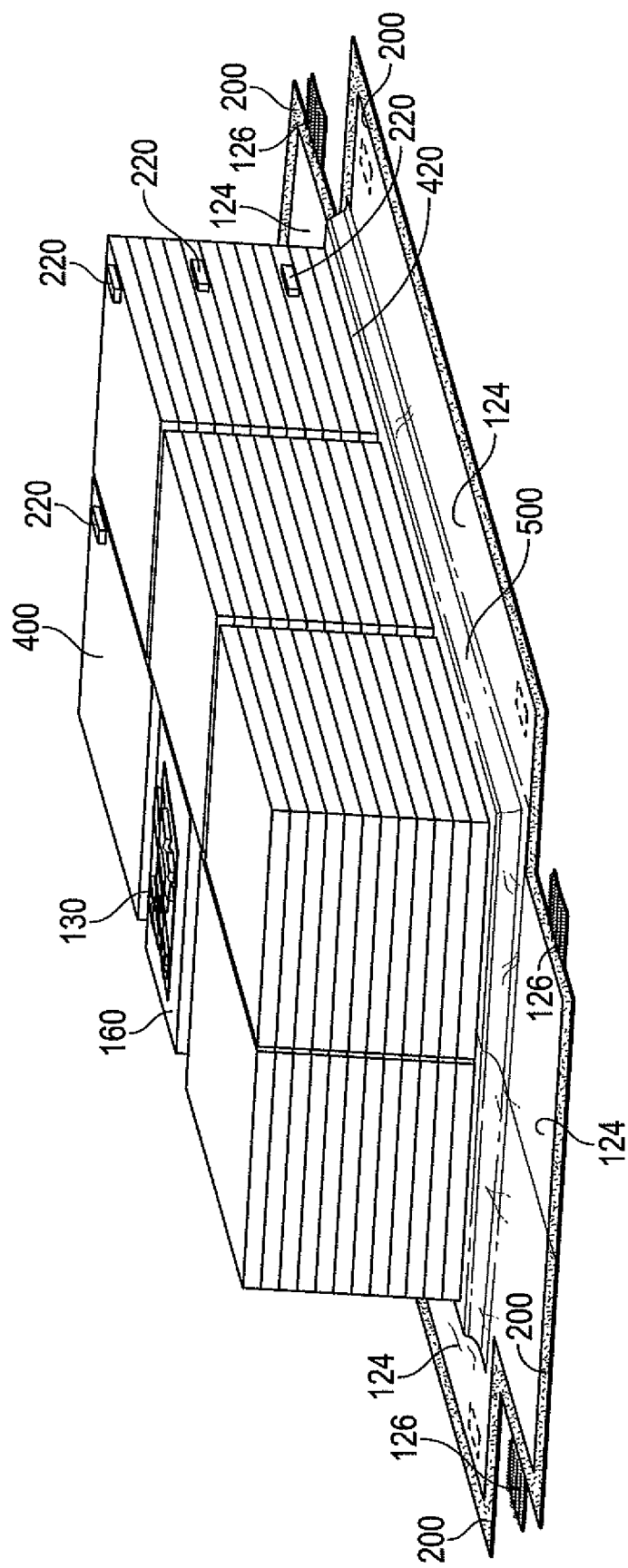
FIG. 11 is a perspective view of an embodiment of the Pro Pod™ of FIG. 10 depicting the bottom side of the header assembly 130 received into the open top of the refrigeration chamber 160 and supported by the refrigeration chamber 160.
Figure 25:
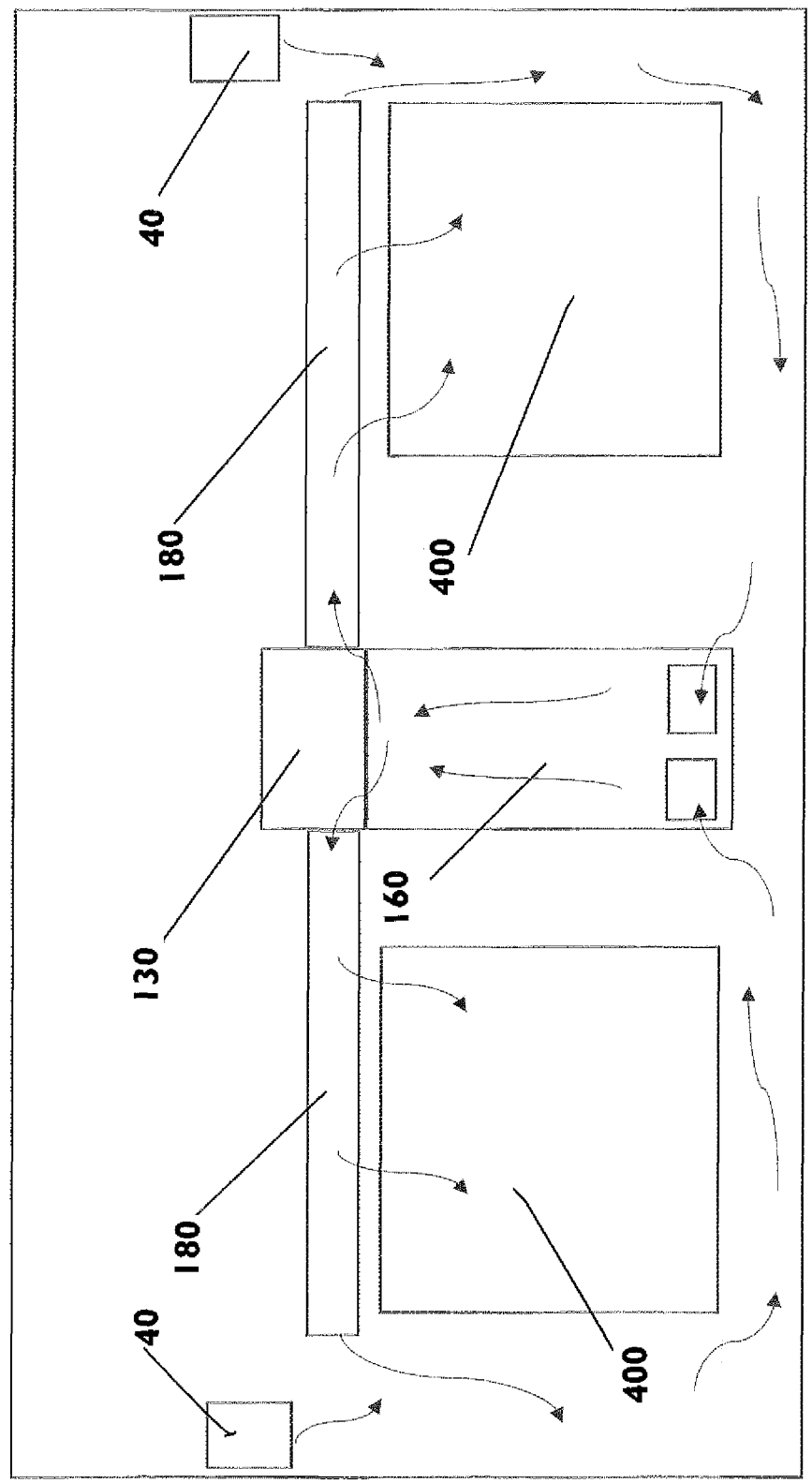
FIG. 25 is a schematic system overview that depicts the chilled air flow circulation for an embodiment of the Pro Pod™.

It is further understood by those having ordinary skill in the art, that pallets 420 also provide space between the internal surface of the assembled bottom panel 20 and the array of pallets of products 400 to further allow the thermostatically controlled flow of chilled air throughout the inside of the container, see, e.g. FIGS. 7, 10 and 25, and around the pallets of products 400.

An embodiment of the Pro Pod™ 100 provides the assembled bottom panel 20, the assembled side panel 24, and the assembled top panel 28 with inner surfaces 240 and outer surfaces 250 made from thermoplastic polyurethane ("TPU") nylon fabric enclosing a uniformly thick internal layer of insulation 260, and having sealed, hot-mold welded edges 270, FIGS. 22 and 23. As such, the assembled bottom panel 20, the assembled side panel 24, and the assembled top panel 28 are detachable into their respective segments, which are collapsible and foldable for easy storage and transport when not in use.

For one embodiment of the Pro Pod™ 100, fiberglass is used as the insulation 260 material between panel inner surfaces 240 and outer surfaces 250 as it is very light weight, it can be provided in thicknesses less than an inch, it is flexible, it is re-useable, and it has high thermal resistance, R Value, properties. Fiberglass proves to be an effective insulation material for protecting chilled, products from heat gain because it almost nullifies two of the three methods of heat transfer—conduction (fiberglass is mostly composed of insulating fibers) and convection (fiberglass microstructure prevents net gas movement). Likewise, fiberglass is a good conductive insulator because it is composed almost entirely of silica fibers, which are very poor heat conductors. Silica is an especially good insulator because silica is also a poor conductor of heat. Finally, fiberglass is a good convective inhibitor because air cannot circulate through the lattice.

For another embodiment of the Pro Pod™ 100, silica aerogel is the insulation 260 material between panel inner surfaces 240 and outer surfaces 250 as it is very light weight, it can be provided in thicknesses less than an inch, it is flexible, it is re-useable, and it has high thermal resistance, R Value, properties. Silica aerogel proves to be an effective insulation material for protecting chilled, products from heat gain because it almost nullifies two of the three methods of heat transfer—conduction (aerogel is mostly composed of insulating gas) and convection (aerogel microstructure prevents net gas movement). Likewise, silica aerogel is a good conductive insulator because it is composed almost entirely of gases, which are very poor heat conductors. Silica aerogel is an especially good insulator because silica is also a poor conductor of heat. Finally, aerogel is a good convective inhibitor because air cannot circulate through the lattice.

One embodiment of the Pro Pod™ 100 is adaptable to an LD-7 container base pallet and the associated Pro Pod™ 100 reusable, substantially airtight container has a height dimension "A", FIGS. 13-14, of approximately 64 inches to provide a Pro Pod™ 100 container volume of approximately 745 cubic feet.

An embodiment of the Pro Pod™ 100 further provides the desired controlled temperature range for the products transported within the reusable, substantially airtight container to a point of delivery is from 34 to 36 degrees Fahrenheit.

An embodiment of a method of practicing the Pro Pod™ 100 includes the steps of:
1) providing a transport base pallet 500;
2) providing an assembled bottom panel 20 comprising two equal sized collapsible panel portions, 118 and 119, each collapsible panel portion comprising an interior surface and an exterior surface, means for hook and loop attachment 200 around an interior surface periphery, wherein a length of the first collapsible panel 118 portion periphery is affixed to a corresponding length of the second collapsible panel portion 119 periphery providing an assembled bottom panel 20 exterior surface sized to be placed upon and cover a top surface of the base pallet 500 comprising a rectangular boundary, the assembled bottom panel 20 exterior surface further sized to extend beyond the base pallet rectangular boundary, the assembled bottom panel 20 further comprising four flaps 124 sized to be folded on an edge to extend orthogonally upward from the base pallet 500, each flap 124 comprising a corner seal 126 means for hook and loop attachment 200 on each assembled bottom panel 20 corner, FIGS. 7-13 and 18A-18C;
3) providing at least one central temperature control assembly/system comprising the steps of:
   a) providing at least one central air circulation assembly 150 housed within the refrigeration chamber 160, and providing at least one integral central ice chamber box 152, at least one integral thermostatically controlled delivery fan 156, at least one integral exhaust port 158, at least one integral power supply 170, at least one integral temperature measuring device 222, at least one integral microprocessor 190, and electrical circuitry interconnecting the at least one integral thermostatically controlled delivery fan 156, the at least one integral power supply 170, the at least one integral temperature measuring device 222 and the at least one integral microprocessor 190, FIG. 1; and
   b) providing at least one header assembly 130, received and supported by a refrigeration chamber 160, and including integral multiple air delivery manifolds or vents 132 and attached ducts 180, an integral thermostatically controlled air circulation fan 136 for each integral air delivery manifold or vent 132 within the header assembly 130, at least one integral temperature measuring device 222, at least one integral microprocessor 192, integral electrical circuitry interconnecting the at least one integral power supply 172, the at least one integral thermostatically controlled delivery fan 136, the at least one integral temperature measuring device 222 and the at least one integral microprocessor 192, FIGS. 2-6;
4) depositing blocks of dry ice within the at least one central ice chamber box 152;
5) providing an assembled side panel 24 comprising two equal sized rectangular collapsible panel end cap portions 120 and two equal sized rectangular collapsible panel side portions 121, each collapsible panel side portion 121 and end cap portion 120 having equal heights, a top edge, a bottom edge, side edges, an interior surface and an exterior surface. Each collapsible panel side portion 121 includes means for hook and loop attachment 200 on the periphery of the interior surfaces and on the side and bottom peripheries of the exterior surfaces. Each collapsible end cap portion 120 further includes means for hook and loop attachment 200 on the periphery exterior surfaces and on the top periphery of the interior surfaces. By attachment of each collapsible end cap portion 120 exterior surface to a corresponding collapsible side portion 121 interior surface, an assembled side panel 24 is provided, FIGS. 17A-17C. The assembled side panel 24 includes an inside surface, an outside surface, a side panel top edge defining a rectangular top opening bounded by the assembled side panel 24 top edges and a side panel bottom edge defining a rectangular bottom opening bounded by the assembled side panel 24 bottom edges. The assembled side panel 24 likewise is sized to be folded around and enclose the array of filled boxes of products 400 and the temperature control assembly/system 150 on the assembled bottom panel 20 covering the base pallet 500, and folded around and enclose the assembled top panel flaps 125 closed over and down upon the assembled array of product containers 400, FIGS. 13-15 and 17A-17C.
6) providing an assembled top panel 28 comprising two equal sized collapsible panel portions, 122 and 123, each collapsible panel portion, 122 and 123, comprising an interior surface and an exterior surface, means for hook and loop attachment 200 around an exterior surface periphery, and one portion having an interior surface periphery length with means for hook and loop attachment, whereby a length of the first collapsible panel portion 122 exterior surface periphery is affixed to a corresponding length of the second collapsible panel portion 123 interior surface periphery providing the assembled top panel 28, an assembled top panel 28 interior surface, an assembled top panel 28 exterior surface, four assembled top panel 28 flaps 125, each assembled top panel 28 flap 125 comprising a corner seal 127 means for hook and loop attachment 200, the assembled top panel 28 further comprising a plurality of pouches 40 within horizontal chambers on the interior surface of the assembled top panel 28, FIGS. 13-16C, and 21;
7) depositing blocks of dry ice within each of the assembled top panel 28 pouches 40;
8) closing the substantially rectangular top opening bounded by the products' 400 tops with an assembled top panel 28 means for hook and loop attachment 200 on assembled top panel 28 flap 125 surface portions extending beyond and down upon the sides of the substantially rectangular top surfaces of products 400 and closing and sealing the assembled top side panel flaps 125 within the assembled side panel 24 top edge corresponding to the means for hook and fastener attachment 200 on the outside surfaces of the assembled side panel 24, and closing the flap 125 corner seal 127 on each assembled top panel 28 corner, FIGS. 13-16C, and 20;

9) closing the bottom opening periphery bounded by the assembled side panel 24 bottom edge by folding the assembled bottom panel 20 flaps 124 on an edge to extend orthogonally upward from the base pallet 500 and engage the means for hook and loop attachment 200 on the assembled bottom panel 20 portions inside surface with means for hook and look attachment 200 on the outside surfaces of the assembled side panel 24 above the assembled side panel 24 bottom edge, and closing the flap 124 corner seal 126 on each assembled bottom panel 20 corner, whereby a reusable, insulated, and substantially airtight container 100 to transport the products is obtained FIGS. 14-15; and 10) maintaining the temperature of the products in the reusable, insulated, and substantially airtight container 100 within a desired temperature range from enclosure of the container through transport to a point of delivery using the at least one temperature control assembly.

It is understood by persons having skill in the art, that the plurality of pallets 420 supporting a substantially cubic three-dimensional array of products 400 necessarily come from, and reside in, a temperature-controlled warehouse environment within the desired temperature range for the specific product being protected during transport.

It is further understood by persons having skill in the art, that the Pro Pod™ 100 method for providing a reusable, insulated, and substantially airtight container to safely transport products, includes steps that are practiced in a similar, or the same, temperature-controlled warehouse environment within the desired temperature range for the specific product being protected during transport.

It is also understood by persons having skill in the art, that after the successful transport of the pallets 420 and the product filled boxes 400 using the Pro Pod™ 100 system, assembly and method for providing a usable, insulated, and substantially airtight container, unloading the pallets 420 and the products 400 takes place in a similarly temperature controlled warehouse environment within the desired temperature range for the specific product being protected during transport. In this manner, all components of the Pro Pod™ 100 assembly and apparatus for providing a reusable, insulated, and substantially airtight container are preconditioned to be within the desired temperature range for the products transport before assembly and loading.

For an embodiment of a method of practicing the Pro Pod™ 100, the step of providing at least one air circulation assembly of the at least one temperature control assembly 150 within the insulated further includes the steps of:

1) providing at least one header assembly 130 comprising at least one integral air delivery manifold 132 and further comprising at least one air duct 180 attached to the at least one integral air delivery manifold 132, FIGS. 3-6 and 11-12;

2) providing at least one integral thermostatically controlled air circulation fan 136 corresponding to the at least one integral air delivery manifold 132 within the at least one header assembly 130, FIGS. 3-6;

3) providing a refrigeration chamber 160 having a top opening sized to receive and support the at least one header assembly 130, FIGS. 2, 9-12;

4) providing the at least one integral central ice chamber box 152 further having at least one integral outlet port 158 and at least one integral thermostatically controlled air delivery fan 156 to feed a controlled flow of chilled air from the at least one chamber box into the bottom of the at least one header assembly 130, FIGS. 1 and 2; and 5) providing microprocessor-based memory and microprocessors 190 and 192 configured by the memory to maintain the temperature within the Pro Pod™ 100 between a desired temperature range, FIGS. 1, 3 and 4.

An embodiment of a method for practicing the Pro Pod™ 100 further provides at least one temperature measuring device 220 that includes at least one temperature sensor with a unitary power supply and wireless output communication signal capabilities, and further provides at least one microprocessor 192 that further includes a wireless receiver to receive the wireless signal from the at least one temperature measuring device 220, FIGS. 3, 4 and 7-12.

An embodiment of a method for practicing the Pro Pod™ 100 includes the steps of:

810 providing a transport base pallet 500;

820 providing an assembled bottom panel 20 sized to be placed upon, cover, and extend beyond all sides of the top surface of the base pallet 500;

830 providing a plurality of pallets 420 each supporting a substantially cubic three-dimensional array of filled boxes of products 400 on the assembled bottom panel 20 covering the top surface of the base pallet 500;

840 providing a central temperature control assembly 150 including a central ice chamber 152, a header assembly 130 with ducts 180, and a refrigeration chamber 160;

850 depositing blocks of dry ice within the central ice chamber 152;

860 providing an assembled top panel 28 and pouches 40, sized to cover and extend beyond the top surfaces of the substantially rectangular array of product containers 400;

870 depositing blocks of dry ice within each of the assembled top panel 28 pouches 40;

880 closing the assembled top panel 28 over and down upon the assembled array of product containers 400;

890 providing an assembled side panel 24 sized to be folded around and enclose the array of filled boxes of products 400 and the temperature control assembly/system 150, header assembly 130, and refrigeration chamber 160 on the assembled bottom panel 20 covering the base pallet 500, and folded around and enclose the assembled top panel 28 closed over and down upon the assembled array of product containers 400;

900 closing the assembled bottom panel 20 up and over the assembled side panel 24; and 910 maintaining the temperature of the array of filled boxes of products 400 within a desired temperature range from enclosure of the container 100 through transport to a point of delivery.

Therefore, the foregoing is considered as illustrative only of the principles of the apparatus, system and method for a reusable, substantially airtight, and insulated container useful container used to package and store perishable goods during long distance transport by ground, air or sea to preserve the temperature of, and prevent heat damage and chill injury to, the goods while in transit. Additionally, since numerous modifications and changes will readily occur to those skilled in the art, it is not desired to limit the apparatus, system and method for a reusable, substantially airtight, and insulated container used to package and store perishable goods during long distance transport by ground, air or sea so as to preserve the temperature of, and prevent heat damage and chill injury to, the goods while in transit to the exact construction and operation shown and described, and further, all suitable modifications and equivalents may be resorted to, falling within the scope of the disclosed apparatus, system and method.

I claim:

1. A system for a reusable, substantially airtight, and insulated container useful in packaging and preserving products for transport, the system comprising:
   A) two equal sized collapsible bottom panel portions, each collapsible bottom panel portion comprising an interior surface and an exterior surface, means for hook and loop attachment on an interior surface periphery, and one collapsible bottom panel portion comprising an exterior surface length periphery comprising means for hook and loop attachment, whereby a length of a first collapsible bottom panel portion internal periphery comprising means for hook and loop attachment is affixed to a corresponding length of a second collapsible bottom panel portion exterior surface length periphery comprising means for hook and loop attachment providing an assembled bottom panel, the assembled bottom panel comprising an assembled bottom panel exterior surface comprising four corners and sized to be placed upon and cover a top surface of a rectangular base pallet, the assembled bottom panel further comprising four flaps sized to extend beyond the rectangular base pallet and to be folded on an edge to extend orthogonally upward from the rectangular base pallet, each flap comprising a corner seal means for hook and loop attachment on each assembled bottom panel corner;
   B) a central temperature control assembly, comprising:
      i) at least one header assembly comprising at least one integral air delivery manifold and further comprising at least one air duct attached to the at least one integral air delivery manifold, at least one temperature measuring device, at least one power supply, and at least one integral microprocessor;
      ii) at least one refrigeration chamber comprising four sides defining a cuboid internal space, an open top sized to receive and support the at least one header assembly, an open bottom, and a plurality of equal sized and spaced openings in a bottom portion of the refrigeration chamber four sides;
      iii) at least one integral thermostatically controlled air circulation fan connected to the at least one integral microprocessor and corresponding to the at least one integral air delivery manifold within the at least one header assembly, the at least one integral thermostatically controlled air circulation fan positioned in the at least one header assembly to directly draw and receive chilled air from the refrigeration chamber and distribute the chilled air through the at least one air duct attached to the at least one integral air delivery manifold of the at least one header assembly, and into and throughout a reusable, substantially airtight and insulated container housing the central temperature control assembly;
      iv) at least one integral microprocessor based memory and at least one processor configured by the at least one integral microprocessor memory to at least a) receive real time temperature readings from the at least one temperature measuring device, and b) maintain the temperature within the reusable, substantially airtight and insulated container within a desired temperature range by controlling a flow of circulated chilled air from the refrigeration chamber and a plurality of assembled top panel pouches throughout the reusable, substantially airtight and insulated container; and
      v) integral electrical circuitry interconnecting the at least one power supply, the at least one thermostatically controlled air delivery fan, the at least one integral temperature measuring device, and the at least one integral microprocessor;
   C) two equal sized rectangular collapsible panel end cap portions and two equal sized rectangular collapsible panel side portions, each collapsible panel side portion and collapsible end cap portion comprising equal heights, a top edge, a bottom edge, side edges, an interior surface and an exterior surface, and further comprising means for hook and loop attachment on a periphery of the interior surfaces and on a side and a bottom periphery of the exterior surfaces of each collapsible end cap portion, and means for hook and loop attachment on a periphery exterior surface and on a top periphery of the interior surface of each collapsible side portion, providing attachment of each collapsible end cap portion exterior surface to a corresponding collapsible side portion interior surface providing an assembled side panel comprising an interior surface, an exterior surface, an assembled side panel top edge defining a rectangular top opening bounded by the assembled side panel top edges, and an assembled side panel bottom edge defining a rectangular bottom opening bounded by the assembled side panel bottom edges, the assembled side panel further sized to be folded around and enclose the central temperature control assembly and a plurality of pallets each comprising a substantially cubic, three-dimensional array of filled boxes of products on the assembled bottom panel covering the rectangular base pallet;
   D) two equal sized collapsible top panel portions, each collapsible top panel portion comprising an interior surface and an exterior surface, means for hook and loop attachment around an exterior surface periphery, and one collapsible top panel portion further comprising an interior surface length comprising means for hook and loop attachment, whereby a length of a first collapsible top panel portion exterior periphery comprising means for hook and loop attachment is affixed to a corresponding length of a second collapsible top panel portion interior periphery comprising means for hook and loop attachment providing an assembled top panel comprising an interior surface and an exterior surface and four corners, and further comprising four assembled top panel flaps sized to be folded on an edge to extend orthogonally downwards from the assembled top panel interior surface resting upon an array of the tops of filled boxes of products bounded by the assembled side panel top edges, each assembled top panel flap comprising a corner seal means for hook and loop attachment, the assembled top panel further comprising a plurality of pouches within horizontal chambers on the interior surface of the assembled top panel surface portions, each pouch comprising hook and loop sealed external access flaps at a downward fold of the assembled top panel, an internal mesh box sized to receive and hold a block of dry ice, a pouch bottom vent strip, and each assembled top panel pouch further comprising at least one block of dry ice in its internal mesh box;

whereby, the tops of the filled boxes of products are closed and sealed within the assembled top panel by folding the assembled top panel flaps orthogonally downwards and closing the corner seal on each collapsible assembled top panel corner;

whereby, the two-equal sized rectangular collapsible panel side portions and two equal sized rectangular collapsible panel end portions are assembled around the temperature control assembly and a plurality of pallets on the assembled bottom panel, with the resulting assembled side panel enclosing the temperature control assembly and the plurality of pallets, and the means for hook and loop attachment on the assembled side panel rectangular top opening interior surface engaging, enclosing, and sealing the means for hook and loop attachment on the assembled top panel flap exterior surfaces;

whereby, the substantially rectangular bottom opening bounded by the assembled side panel bottom edge is closed and sealed within the assembled bottom panel by folding the extended assembled bottom panel flaps orthogonally upwards from the rectangular base pallet and engaging the means for hook and loop attachment on the assembled bottom panel internal surface with means for hook and loop attachment on the assembled side panel external surfaces, and closing the assembled bottom panel cover flap corner seal means on each assembled bottom panel corner;

whereby a reusable, substantially airtight container to transport the products is obtained; and whereby the central temperature control assembly maintains the temperature of the products in the reusable, substantially airtight and insulated container within a desired temperature range.

2. The system of claim 1 further comprising:
A) at least one central ice chamber box comprising dry ice, at least one integral exhaust port, and at least one integral thermostatically controlled air delivery fan comprising connection to the at least one integral microprocessor to feed a controlled flow of chilled air from the at least one central ice chamber box through the at least one integral exhaust port; the at least one central ice chamber box sized to be received by and housed within the at least one refrigeration chamber cuboid internal space;
B) at least one integral temperature measuring device comprising connection to the at least one integral microprocessor; and
C) integral electrical circuitry interconnecting the at least one power supply, the at least one thermostatically controlled air delivery fan, the at least one integral temperature measuring device, and the at least one integral microprocessor;

whereby a supplemental source of chilled air is provided by the at least one integral exhaust port into the at least one refrigeration chamber as necessary for the central temperature control assembly to maintain the temperature of the products within a desired temperature range in the reusable, substantially airtight and insulated container.

3. The system of claim 2 wherein the connection between the at least one integral temperature measuring device and the at least one integral microprocessor comprises direct electrical wiring.

4. The system of claim 2 wherein the connection between the at least one integral temperature measuring device and the at least one integral microprocessor comprises at least one temperature sensor comprising a unitary power supply and wireless output communication signal capabilities, and the at least one integral microprocessor further comprises a wireless receiver to receive a wireless signal from the at least one temperature measuring device.

5. The system of claim 2 wherein the at least one air duct attached to the at least one air delivery manifold of the at least one header assembly is disposed across the array of product box top surfaces and under the inside surface of the assembled top panel.

6. The system of claim 1 wherein the assembled bottom panel, the assembled side panel, the assembled top panel, the assembled top panel pouches, and each assembled top panel pouch external access flap comprise inner surfaces and outer surfaces, the inner surfaces and the outer surfaces comprising a thermoplastic polyurethane nylon fabric bonded to a uniformly thick internal layer of insulation, and sealed, hot-mold welded edges.

7. The system of claim 1 wherein the rectangular base pallet comprises an LD-7 container supporting a reusable, substantially airtight and insulated container volume 745 cubic feet.

8. The system of claim 1 wherein the temperature range for the products transported within the reusable, substantially airtight and insulated container is maintained from 34 degrees Fahrenheit to 36 degrees Fahrenheit.

9. An assembly for a reusable, substantially airtight, and insulated container comprising:
A) an assembled bottom panel comprising two equal sized collapsible panel portions, each collapsible bottom panel portion comprising an interior surface and an exterior surface, means for hook and loop attachment around an interior surface periphery, and one collapsible bottom panel portion comprising an exterior surface periphery length comprising means for hook and loop attachment, whereby a length of a first collapsible bottom panel portion internal periphery comprising means for hook and loop attachment is affixed to a corresponding length of a second collapsible bottom panel portion exterior surface periphery comprising means for hook and loop attachment providing an assembled bottom panel comprising four corners, an interior surface, and an exterior surface, the assembled bottom panel exterior surface sized to be placed upon and cover a top surface of a rectangular base pallet, the assembled bottom panel further comprising four flaps sized to extend beyond the rectangular base pallet and to be folded on an edge to extend orthogonally upward from the rectangular base pallet, each assembled bottom panel flap comprising a corner seal means for hook and loop attachment on each assembled bottom panel corner;
B) an assembled side panel comprising two equal sized rectangular collapsible panel end cap portions and two equal sized rectangular collapsible panel side portions, each collapsible panel side and end cap portion comprising equal heights, a top edge, a bottom edge, side edges, an interior surface and an exterior surface, and further comprising means for hook and loop attachment on the periphery of the interior surfaces and on the side and bottom peripheries of the exterior surfaces of each collapsible end cap portion, and means for hook and loop attachment on the periphery exterior surfaces and on the top periphery of the interior surfaces of each collapsible side portion, providing attachment of each end portion to corresponding side portions providing an assembled side panel comprising an inside surface, an outside surface, a side panel top edge defining a rectangular top opening bounded by the assembled side panel top edges and a side panel bottom edge defining a rectangular bottom opening bounded by the assembled side panel bottom edges, the assembled side panel further sized to be folded around and enclose the sides of a plurality of pallets each supporting a substantially cubic three-dimensional array of filled boxes of products and a temperature control assembly on the assembled bottom panel covering the rectangular base pallet; and C) an assembled top panel comprising two equal sized collapsible top panel portions, each collapsible top panel portion comprising an interior surface and an exterior surface, means for hook and loop attachment around an exterior surface periphery, and one collapsible bottom panel portion comprising an interior surface periphery length comprising means for hook and loop attachment, whereby a length of a first collapsible top panel portion exterior periphery comprising means for hook and loop attachment is affixed to a corresponding length of a second collapsible top panel portion interior surface periphery comprising means for hook and loop attachment providing an assembled top panel comprising an interior surface and an exterior surface, and further comprising four assembled top panel flaps sized to be folded on an edge to extend orthogonally downwards from the assembled top panel interior surface resting upon an array of the tops of filled boxes of products bounded by the assembled side panel top edges, each assembled top panel flap comprising a corner seal means for hook and loop attachment, the assembled top panel further comprising a plurality of pouches on the interior surface of the assembled top panel surface portions, each pouch comprising hook an loop sealed external access flaps at a downward fold of the assembled top panel, an internal mesh box sized to receive and hold a block of dry ice, a pouch bottom vent strip, and each assembled top panel pouch further comprising at least one block of dry ice in its internal mesh box; and D) at least one temperature control assembly within the reusable, substantially airtight, and insulated container further comprising:
i) at least one header assembly comprising at least one integral air delivery manifold and further comprising at least one air duct attached to the at least one integral air delivery manifold, at least one temperature measuring devise, and at least one integral microprocessor;
ii) at least one refrigeration chamber comprising four sides defining a cuboid internal space, an open top sized to receive and support the at least one header assembly, an open bottom, and further comprising a plurality of equal sized and spaced openings in a bottom portion of the refrigeration chamber four sides;
iii) at least one integral thermostatically controlled air circulation fan connected to at least one integral microprocessor and corresponding to the at least one air delivery manifold within the at least one header assembly, the at least one integral thermostatically controlled air circulation fan positioned in the at least one header assembly to draw and receive chilled air from the refrigeration chamber and distribute the chilled air through the at least one air duct attached to the at least one integral air delivery manifold of the at least one header assembly, and into and throughhout the reusable, substantially airtight and insulated container; and
iv) at least one microprocessor based memory and at least one processor configured by the at least one integral microprocessor memory to at least 1) receive real time temperature readings from the at least one temperature measuring device, and 2) maintain the temperature within the reusable, substantially airtight and insulated container within a desired temperature range by control of the flow of chilled air from the refrigeration chamber and the plurality of assembled top panel pouches and circulated throughout the reusable, substantially airtight and insulated container.

10. The assembly for a reusable, substantially airtight, and insulated container of claim 9 further comprising:
A) at least one central ice chamber box comprising dry ice, at least one integral exhaust port, and at least one integral thermostatically controlled air delivery fan comprising connection to the at least one integral microprocessor to feed a controlled flow of chilled air from the at least one central ice chamber box through the at least one integral exhaust port, the at least one central ice chamber box sized to be received by and housed within the at least one refrigeration chamber;
B) at least one integral temperature measuring device comprising connections to the at least one integral microprocessor; and
C) integral electrical circuitry interconnecting the at least one power supply, the at least one thermostatically controlled air delivery fan, the at least one integral temperature measuring device, and the at least one integral microprocessor;
whereby a supplemental source of chilled air is provided by the at least one integral exhaust port into the at least one refrigeration chamber as necessary for the central temperature control assembly to maintain the temperature of the products in the reusable, substantially airtight and insulated container within a desired temperature range.

11. The system of claim 10 wherein the connection between the at least one integral temperature measuring device and the at least one integral microprocessor comprises direct electrical wiring.

12. The system of claim 10 wherein the connection between the at least one integral temperature measuring device and the at least one integral microprocessor comprises at least one temperature sensor comprising a unitary power supply and wireless output communication signal capabilities, and the at least one integral microprocessor further comprises a wireless receiver to receive a wireless signal from the at least one temperature measuring device.

13. The assembly of claim 10 wherein the at least one air duct attached to the at least one air delivery manifold of the at least one header as disposed across the array of product box top surfaces and under the inside surface of the assembled top panel.

14. The assembly of claim 10 wherein the assembled bottom panel, the assembled side panel, the assembled top panel pouches, and each assembled top panel pouch external access flap comprise inner surfaces and outer surfaces, the inner surfaces and the outer surfaces comprising a thermoplastic polyurethane nylon fabric bonded to a uniformly thick internal layer of insulation, and sealed, hot-mold welded edges.

15. The assembly of claim 10 wherein the rectangular base pallet comprises an LD-7 container supporting a reusable, substantially airtight, and insulated container volume of 745 cubic feet.

16. The assembly claim 10 wherein the temperature range for the products transported within the reusable, substantially airtight, and insulated container is maintained from 34 degrees Fahrenheit to 36 degrees Fahrenheit.

17. A method for providing a reusable, substantially airtight, and insulated container to safely transport perishable products, the method comprising the steps of:
  A) providing a rectangular base pallet;
  B) providing assembled bottom panel comprising two equal sized collapsible bottom panel portions, each collapsible bottom panel portion comprising an interior surface and an exterior surface, means for hook and loop attachment around an interior surface periphery, and one collapsible bottom panel portion comprising an exterior surface periphery length comprising means for hook and loop attachment, wherein a length of a collapsible bottom panel portion internal periphery comprising means for hook and loop attachment is affixed to a corresponding length of a second collapsible bottom panel portion external periphery comprising means for hook and loop attachment providing an assembled bottom panel exterior surface sized to be placed upon and cover a top surface of the rectangular base pallet, the assembled bottom panel further comprising four corners, and four panel flaps sized to extend beyond the rectangular base pallet and to be folded on an edge to extend orthogonally upward from the rectangular base pallet, each flap comprising a corner seal means for hook and loop attachment on each assembled bottom panel corner;
  C) providing at least one temperature control assembly comprising the steps of:
    i) providing at least one integral power supply;
    ii) providing at least one integral temperature measuring device;
    iii) providing at least one integral microprocessor;
    iv) providing at least one header assembly comprising at least one integral air delivery manifold and further comprising at least one air duct attached to the at least one integral air delivery manifold;
    v) providing at least one refrigeration chamber comprising four sides defining a cuboid internal space, an open top sized to receive and support the at least one header assembly, an open bottom, and further comprising a plurality of equal sized and spaced openings in a bottom portion of the refrigeration chamber four sides;
    v) providing at least one integral thermostatically controlled air circulation fan connected to at least one integral microprocessor and corresponding to the at least one integral air delivery manifold within the at least one header assembly, the at least one integral thermostatically controlled air circulation fan positioned in the at least one header assembly to directly receive chilled air from the refrigeration unit and distribute the chilled air through the at least one air duct attached to the at least one integral air delivery manifold of the at least one header assembly, and into and throughout the reusable, substantially airtight container;
    vii) providing at least one microprocessor based memory and at least one processor configured by the at least one integral microprocessor memory to at least 1) receive real time temperature readings from the at least one integral temperature measuring device, and 2) maintain the temperature within the reusable, substantially airtight container within a desired temperature range by control of the circulation flow of chilled air from the refrigeration chamber and the plurality of assembled top panel pouches throughout the reusable, substantially airtight container; and
    iii) providing integral electrical circuitry interconnecting the at least one integral power supply, the at least one integral thermostatically controlled air delivery fan, the at least one integral temperature measuring device and the at least one integral microprocessor;
  D) depositing blocks of dry ice within the at least one integral central ice chamber box;
  E) providing an assembled side panel comprising two equal sized rectangular collapsible panel end cap portions and two equal sized rectangular collapsible panel side portions, each collapsible panel side and end cap portion comprising equal heights, a top edge, a bottom edge, side edges, an interior surface and an exterior surface, and further comprising means for hook and loop attachment on the periphery of the interior surfaces and on the side aid bottom peripheries of the exterior surfaces of each collapsible end cap portion, and means for hook and loop attachment on the periphery exterior surfaces and on the top periphery of the interior surfaces of each collapsible side portion, and further providing attachment of each end cap portion edge to a corresponding side portion edge providing an assembled side panel comprising an inside surface, an outside surface, a side panel top edge defining a rectangular top opening bounded by the assembled side panel top edges and a side panel bottom edge defining a rectangular bottom opening of equal size to the rectangular top opening bounded by the assembled side panel bottom edges, the assembled side panel further sized to be folded around and enclose the temperature control assembly and a plurality of pallets each supporting a substantially cubic, three-dimensional array of filled boxes of products on the assembled bottom panel covering the rectangular base pallet;
  F) providing an assembled top panel comprising two equal sized collapsible top panel portions, each collapsible top panel portion comprising an interior surface and an exterior surface, means for hook and loop attachment around an exterior surface periphery, and one collapsible top panel portion comprising an interior surface periphery length comprising means for hook and loop attachment, whereby a length of a first collapsible top panel portion exterior periphery comprising means for hook and loop attachment is affixed to a corresponding length of a second collapsible top panel portion interior periphery comprising means for hook and loop attachment providing the assembled top panel, an assembled top panel interior surface, an assembled top panel exterior surface, four assembled top panel flaps sized to be folded on an edge to extend orthogonally downwards from a substantially rectangular configuration of an array of the tops of filled boxes of products, each assembled top panel flap comprising a corner seal means for hook and loop attachment, the assembled top panel further comprising a plurality of pouches within a horizontal chamber on the interior surface of the assembled top panel surface portions, each pouch comprising hook and loop sealed external flaps at a downward fold of the assembled top panel, an internal mesh box sized to receive and hold a block of dry ice, and a pouch bottom vent strip;

G) depositing blocks of dry ice within each of the mesh box of each assembled top panel pouches;

H) closing the assembled top panel over and down upon the assembled array of product containers and closing the flap corner seal on each assembled top panel corner using the means for hook and loop attachment;

I) folding the assembled side panel around to enclose the array of filled boxes of products and the temperature control assembly/system on the assembled bottom panel covering the base pallet by engaging the means for hook and loop attachment on the assembled top panel flaps closed over and down upon the array of product containers with the means for hook and loop attachment on the interior surface of the assembled side panel top edges;

J) closing the substantially rectangular bottom opening periphery bounded by the assembled side panel bottom edge by folding the extended assembled bottom panel on an edge to extend orthogonally upward from the base unitary panel sized to correspond to and extend beyond the assembled side panel bottom edges by raising the assembled bottom panel flap portions extending beyond the base pallet rectangular boundary orthogonally upward from the base pallet and engaging the means for hook and loop attachment the assembled bottom panel portions inside surface with means for hook and look attachment on the outside surfaces of the assembled side panel above the assembled side panel bottom edge, and closing the flap corner seal on each assembled bottom panel corner, whereby a reusable, substantially airtight and insulated container to transport the products is obtained; and K) maintaining the temperature of the products in the reusable, substantially airtight and insulated container within a desired temperature range using the at least one temperature control assembly.

18. The method of claim 17 wherein the step of providing at least one temperature control assembly within the insulated further comprises the steps of:

A) providing at least one integral central ice chamber box sized to be received by and housed within the at least one refrigeration chamber, and comprising at least one exhaust port and at least one integral thermostatically controlled air delivery fan to feed a controlled flow of chilled air from the at least one central ice chamber box through the at least one exhaust port;

B) providing integral electrical circuitry interconnecting the at least one integral power supply, the at least one central ice chamber box integral thermostatically controlled air delivery fan, the at least one integral temperature measuring device and the at least one integral microprocessor; and C) depositing blocks of dry ice within the at least one integral central ice chamber box.

19. The method of claim 18 wherein the connection between the at least one integral temperature measuring device and the at least one integral microprocessor comprises direct electrical wiring.

20. The method of claim 18 wherein the connection between the at least one integral temperature measuring device and the at least one integral microprocessor comprises at least one temperature sensor comprising a unitary power supply and wireless output communication signal capabilities, and the at least one integral microprocessor further comprises a wireless receiver to receive a wireless signal from the at least one temperature measuring device.

21. The method of claim 18 wherein the step of providing at least one header assembly further comprises disposing the at least one header assembly duct across the array of product box top surfaces and under the inside surface of the assembled top panel.

22. The method of claim 18 wherein the assembled bottom panel, the assembled side panel, the assembled top panel, the assembled top panel pouches, and each assembled top panel pouch external access flap comprise inner surfaces and outer surfaces, the inner surfaces and the outer surfaces comprising a thermoplastic polyurethane nylon fabric bonded to a uniformly thick internal layer of insulation, and sealed, hot-mold welded edges.

23. The method of claim 18 wherein the base pallet comprises an LD-7 container supporting a reusable, substantially airtight and insulated container volume of approximately 745 cubic feet.

24. The method of claim 18 wherein the temperature range in the reusable, substantially airtight and insulated container is maintained from 34 degrees Fahrenheit to 36 degrees Fahrenheit.

* * * * *

UNITED STATES PATENT AND TRADEMARK OFFICE
CERTIFICATE OF CORRECTION

PATENT NO. : 10,619,907 B2  
APPLICATION NO. : 15/946758  
DATED : April 14, 2020  
INVENTOR(S) : Keith A. Kenneally Page 1 of 2

It is certified that error appears in the above-identified patent and that said Letters Patent is hereby corrected as shown below:

In the Claims

Column 17  
Line 7, Claim 1 insert --use with-- between "for" and "a"

Column 18  
Line 8, Claim 1 remove [delivery] and add -circulation-  
Line 9, Claim 1 remove [integral]  
Line 66, Claim 1 remove [its] and add -the- Column 19  
Line 9, Claim 1 remove [a] and add -the-  
Line 25, Claim 1 add -the- before "means"  
Line 29, Claim 1 remove [a] and add -the-  
Line 33, Claim 1 remove [a] and add -the-  
Line 58, Claim 2 remove [a] and add -the- Column 20  
Line 9, Claim 5, add -the- before "product"  
Line 60, Claim 9, remove [the] after "on" and add -a- before "periphery"  
Line 60, Claim 9, remove [the] after "on" and before "side"  
Line 64, Claim 9, remove [the] after "of" and before "exterior"  
Line 65, Claim 9, remove [the] after "on" and add -a-

Column 21  
Line 18, Claim 9, remove [bottom] and add -top-  
Line 40, Claim 9, remove [its] and add -the-  
Line 49, Claim 9, change "devise" to -device- Signed and Sealed this  
Twenty-ninth Day of September, 2020

Andrei Iancu  
*Director of the United States Patent and Trademark Office*

CERTIFICATE OF CORRECTION (continued)
U.S. Pat. No. 10,619,907 B2

Column 22
Line 2, Claim 9, change "throughhout" to -throughout-
Line 5, Claim 9, remove [the]
Line 11, Claim 9, change "the" to -a-
Line 41, Claim 10, change "the" to -a-
Line 43, Claim 11, change "system" to -assembly-
Line 47, Claim 12, change "system" to -assembly-
Line 57, Claim 13, add -the- after "of"

Column 23
Line 52, Claim 17, change "v)" to -vi)-
Line 59, Claim 17, change "unit" to -chamber-
Line 67, Claim 17, remove "integral"

Column 24
Line 5, Claim 17, change "the" to -a-
Line 7, Claim 17, change "the" to -a-
Line 12, Claim 17, change "delivery" to -circulation-
Line 15, Claim 17, remove "the"
Line 24, Claim 17, change "the" to -a- between "on" and "periphery"
Line 24, Claim 17, remove "the" between "of" and "interior"
Line 25, Claim 17, change "aid" to -and-
Line 27, Claim 17, remove "the" between "on" and "periphery"
Line 28, Claim 17, change "the" to -a- between "on" and "top"
Line 61, Claim 17, change "an" to -the-
Line 61, Claim 17, add -the- between "of" and "filled"

Column 25
Line 4, Claim 17, change "blocks of" to -the-
Line 11, Claim 17, add -the- between "of" and "filled"
Line 16, Claim 17, change "product containers" to -the filled boxes of products-
Line 19, Claim 17, change "the" to -a-
Line 21, Claim 17, change "the" to -an-
Line 22, Claim 17, change "the" to -a-
Line 33, Claim 17, change "a" to -the-
Line 38, Claim 17, change "a" to -the-
Line 41, Claim 18, add -the- before "at"
Lines 41 and 42, remove "within the insulated"

Column 26
Line 26, Claim 21, add -the- before "at"
Line 26, Claim 21, remove [the] after "disposing"
Line 27, Claim 21, add -the- between "of" and "product"